(12) United States Patent
Alverson et al.

(10) Patent No.: US 12,436,594 B2
(45) Date of Patent: Oct. 7, 2025

(54) PREDICTIVE DISPLAY POWER CONTROL SYSTEMS AND METHODS

(71) Applicant: Apple Inc., Cupertino, CA (US)

(72) Inventors: Joseph F Alverson, Redwood City, CA (US); Brad W Simeral, San Francisco, CA (US); Daniel J Drusch, Appleton, WI (US); Daniel P Kumar, Fremont, CA (US); Derek J DiCarlo, Santa Clara, CA (US); Ricky Wai Kit Yuen, Saratoga, CA (US); Roberto G Yepez, San Francisco, CA (US); Shashi K Dua, Los Gatos, CA (US); Ardra Singh, San Francisco, CA (US); Gabrielle Andrea Badie Belzberg, San Francisco, CA (US); Kartik Venkatraman, San Francisco, CA (US); Gierad Laput, Pittsburgh, PA (US); Archana Venkatesh, Santa Clara, CA (US); Jingran Zhou, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 538 days.

(21) Appl. No.: 17/929,932

(22) Filed: Sep. 6, 2022

(65) Prior Publication Data

US 2024/0077930 A1    Mar. 7, 2024

(51) Int. Cl.
*G06F 1/3206* (2019.01)
*G06F 1/3234* (2019.01)

(52) U.S. Cl.
CPC .......... *G06F 1/3265* (2013.01); *G06F 1/3206* (2013.01)

(58) Field of Classification Search
CPC .............................. G06F 1/3265; G06F 1/3206
See application file for complete search history.

(56) References Cited

U.S. PATENT DOCUMENTS

| | | |
|---|---|---|
| 9,009,516 B1 | 4/2015 | Gabayan et al. |
| 9,513,703 B2 | 12/2016 | Whitney et al. |
| 9,554,100 B2 | 1/2017 | Gousev et al. |
| 9,874,933 B1 | 1/2018 | Carryer |
| 9,891,696 B2 | 2/2018 | Chng |

(Continued)

FOREIGN PATENT DOCUMENTS

| | | |
|---|---|---|
| CN | 108770046 A | 11/2018 |
| WO | 2021050190 A1 | 3/2021 |
| WO | 2021258395 A1 | 12/2021 |

OTHER PUBLICATIONS

International Search Report and Written Opinion for PCT Application No. PCT/US2023/031543 dated Dec. 18, 2023; 18 pgs.

*Primary Examiner* — Gary Collins
(74) *Attorney, Agent, or Firm* — FLETCHER YODER PC

(57) ABSTRACT

The present disclosure describes systems and methods associated with selective powering of an electronic display in response to operating conditions, additional data, and/or predicting that the electronic display is not going to be viewed or visible. By selectively enabling the electronic display between power states based on a prediction of when a viewer is expected to view the electronic display, a perceivably always-on electronic display may be provided without the electronic display being always-on, thereby balancing consumer interests with technical requirements of a relatively long battery life and correspondingly low power consumption.

20 Claims, 15 Drawing Sheets

(56) References Cited

U.S. PATENT DOCUMENTS

| | | |
|---|---|---|
| 10,089,851 B1 | 10/2018 | Singh |
| 10,181,277 B2 | 1/2019 | Choi et al. |
| 10,736,042 B2 | 8/2020 | Lee et al. |
| 10,748,488 B2 | 8/2020 | Lee |
| 11,570,717 B2 | 1/2023 | Lu et al. |
| 2008/0005381 A1* | 1/2008 | Theocharous ........ G06F 1/3203 710/18 |
| 2011/0080349 A1 | 4/2011 | Holbein |
| 2016/0018872 A1 | 1/2016 | Tu et al. |
| 2019/0303322 A1 | 10/2019 | Sharma |
| 2020/0273410 A1 | 8/2020 | Yu |
| 2021/0056286 A1* | 2/2021 | Cheng .................. G06F 1/3265 |
| 2021/0064146 A1 | 3/2021 | Stern et al. |
| 2021/0116986 A1 | 4/2021 | Li et al. |
| 2021/0191499 A1 | 6/2021 | Holland et al. |
| 2021/0248978 A1 | 8/2021 | Kim |
| 2021/0318743 A1 | 10/2021 | Partiwala et al. |
| 2021/0318758 A1 | 10/2021 | Lazaridis et al. |
| 2022/0083122 A1 | 3/2022 | Rachakonda et al. |
| 2023/0360444 A1 | 11/2023 | Jenson |
| 2023/0418703 A1 | 12/2023 | Pinhas |
| 2024/0168573 A1 | 5/2024 | Li |

* cited by examiner

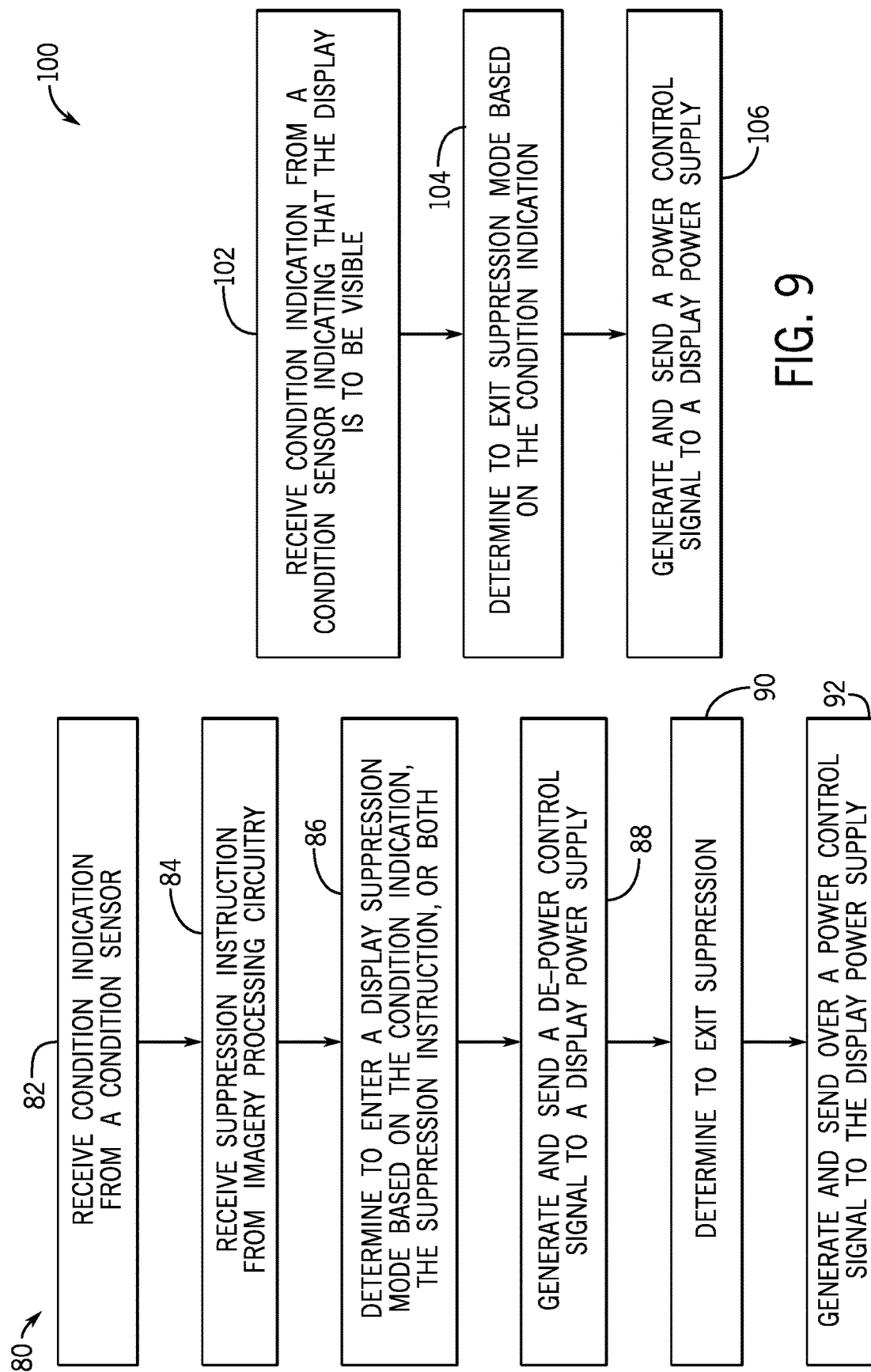

PREDICTIVE DISPLAY POWER CONTROL SYSTEMS AND METHODS

BACKGROUND

The present disclosure relates generally to electronic device operations, and more specifically to power management operations of an electronic device.

Electronic devices often use one or more electronic displays to present visual representations of information as text, still images, and/or video by displaying one or more images (e.g., image frames). For example, such electronic devices may include computers, mobile phones, portable media devices, tablets, televisions, virtual-reality headsets, and vehicle dashboards, among many other types of devices. In any case, to display an image, an electronic display may control light emission (e.g., brightness, luminance, color) of its display pixels based at least in part on corresponding image data.

In some instances, while an electronic device is powered on, its electronic display may have the ability to be selectively powered on or powered off. When powered on (i.e., in a powered-on state), an electronic display may display images. However, an electronic display generally consumes more electrical power when powered on compared to when it is powered off (i.e., in a powered-off state). Thus, increasing the duration an electronic display is powered on may increase the amount of time a person can view images on the display, but doing so may consume more power. This may be of particular concern for wearable and/or portable electronic devices with batteries that store a finite amount of electrical energy.

To reduce power consumption, the electronic device may be operated in an always-on display operational mode during which the electronic display may be operated to always present an image frame. Indeed, an image frame may be pre-rendered and stored in memory by a source of image data, an image source. The electronic device may enter an always-on display operational mode based on the pre-rendering of the image frame. Once the image frame is pre-rendered, the electronic device may power off the image source to reduce an overall amount of power consumed by the electronic device and the pre-rendered image frame may be read from the memory at a later time independent of the image source being powered on. The always-on display operational mode may improve user experience with the electronic device and thus it may be desirable for the electronic device to have an always-on display. However, doing so may come with relatively high power costs since the electronic display may be always presenting image data even when not visible by a user.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a system may include an electronic display, which may be powered off. The system may include a condition pre-processor that, while the electronic display is powered off, may generate a first signal that indicates that one or more sensors generated sensing data corresponding to the electronic display being visible at a future time. The system may further include processing circuitry that receives the first signal from the condition pre-processor and returns power to the electronic display based on the first signal before the future time.

Indeed, the electronic display may render, before the future time, an image corresponding to a de-contented image frame associated with an always-on display operational mode.

The condition pre-processor may generate the first signal based on a second signal from an associated electronic device.

The one or more sensors may include an accelerometer, where the condition pre-processor may generate the first signal based on the accelerometer detecting a change in a pattern of motion.

The condition pre-processor may generate the first signal based on an ambient light sensor sensing an ambient light level below a threshold.

The condition pre-processor may generate a third signal based on an accelerometer to sensing a motion corresponding to the electronic display being concealed.

The processing circuitry may generate a first control signal to de-power the electronic display and may generate a second control signal to power the electronic display before the predicted future time.

In some cases, the system may include a sensor. When the system includes the sensor, the condition pre-processor may receive a second signal from the sensor indicative of an ambient environment. The condition pre-processor may determine the second signal indicates a first condition associated with the electronic display being visible at the future time. The condition pre-processor may validate the first condition based on one or more additional signals and may generate the first signal in response to validating the first condition.

Sometimes, the condition pre-processor generates the first signal based on a motion profile indicating one or more sensed signals that correspond to a pattern of motion.

In another embodiment, a method may include receiving a first signal that indicates an electronic display is not being used from a condition pre-processor; generating a first control signal to de-power the electronic display based on the first signal; receiving a second signal from one or more sensors that corresponds to the electronic display being visible at a future time from the condition pre-processor; and generating a second control signal to power the electronic display before the future time based on the second signal.

The method may also include pausing a flip-book based on the first signal. The method may also then include discarding a remaining portion of the paused flip-book based on the second signal and the predicted future time.

The method may include determining to enter a suppression mode based on the first signal. In response to determining to enter the suppression mode, the method may include generating the first control signal based on the first signal.

The one or more sensors may include an accelerometer, where the second signal is generated based on the accelerometer generating sensing data corresponding to a change in a pattern of motion.

In some cases, the first signal is generated based on the one or more sensors detecting a period of non-use of the electronic display.

The one or more sensors may an inertial measurement unit (IMU), a proximity sensor, a radio frequency (RF) sensor, a pressure sensor, a temperature sensor, an ultrasound sensor, an infrared sensor, a motion detecting sensor, a gyroscope, a humidity sensor, an audio sensor, or any combination thereof.

In yet another embodiment, a tangible, non-transitory, computer-readable medium includes instructions that, when executed by one or more processors, may cause an electronic device to perform operations that include receiving a first signal. The first signal may indicate that a sensor generated sensing data corresponding to an electronic display of the electronic device being visible at a future time from a condition pre-processor. The operations may include generating a first control signal to power the electronic display before the future time based on the first signal and sending the first control signal to a power supply of the electronic display.

In some cases, the first signal is generated based on motion data. In some cases, the first signal is generated based on detecting an associated electronic device. In some cases, the first signal is generated based on signals generated by a plurality of sensors.

In some embodiments, the operations include receiving a second signal that instructs de-powering the electronic display. The operations may also include generating a second control signal to de-power the electronic display before receiving the first signal based on the second signal.

In yet another embodiment, a system may include an electronic display that may be powered off as part of a suppression operation. The system may include a condition pre-processor that, while the electronic display is powered off, generates a first signal that indicates that the electronic display is predicted to be visible at a future time. The system may further include processing circuitry that determines to suppress the electronic display. The processing circuitry may generate a first control signal to power off the electronic display based on the determination to suppress the electronic display, the first control signal may cause a power supply to remove a first power amount from the electronic display. The processing circuitry may send the first control signal to the power supply and may receive the first signal from the condition pre-processor. The processing circuitry may return the first power amount to the electronic display based on the first signal before the predicted future time.

In some cases, the condition pre-processor may further generate the first signal based on a machine learning engine predicting a period of non-use of the electronic display. In these cases, the processing circuitry may further receive a second signal from the condition pre-processor and may return a second power amount to the electronic display based on the first signal and the second signal before the predicted future time. The second power amount may be less than the first power amount. Furthermore, in these cases, the electronic display may render, after being returned the second power amount, an image corresponding to a de-contented image frame associated with an always-on display operational mode. Furthermore, in these cases, the processing circuitry may further receive a third signal from the condition pre-processor and may generate a second control signal to power off the electronic display based on the third signal. The second control signal may cause the power supply to remove the second power amount. The processing circuitry may further generate a third control signal to return the first power amount to the electronic display based on the first signal, the second signal, the third signal, or a combination thereof before the predicted future time. Furthermore, in these cases, the condition pre-processor may further generate the second signal based on determining whether the electronic display was suppressed in a past threshold amount of time, determining whether the electronic display is expected to be unsuppressed within a first threshold amount of time from the predicted future time, determining whether the electronic display was unlocked for a second threshold amount of time while suppressed, determining whether the electronic display was unlocked a threshold number of times while suppressed, or any combination thereof. Furthermore, in these cases, the processing circuitry may further generate the second control signal based on determining that the electronic display was not suppressed in a past threshold amount of time, determining that the electronic display is not expected to be unsuppressed within a first threshold amount of time from the predicted future time, determining that the electronic display was not unlocked for a second threshold amount of time while suppressed, and determining that the electronic display was not unlocked a threshold number of times while suppressed.

In some cases, the condition pre-processor may generate the first signal based on a motion profile indicating one or more sensed signals that correspond to a pattern of motion. In some cases, the processing circuitry may determine to suppress the electronic display based on receiving a first indication to enter a low power mode, a second indication that an associated electronic display is no longer a threshold distance from a sensor, a third indication that the electronic display is obstructed, a fourth indication of inactivity, or any combination thereof.

In another embodiment, a method may include receiving a first signal that indicates an electronic display is not being used from a condition pre-processor. The method may include generating a first control signal to de-power the electronic display based on the first signal. The method may also include receiving a second signal that indicates the electronic display is predicted to be visible at a first future time from the condition pre-processor. The method may also include generating a second control signal to power the electronic display before the first future time based on the second signal.

In some cases, the method may include pausing a flip-book based on the first signal and discarding a remaining portion of the paused flip-book based on the second signal and the first future time.

In some cases, the method may include determining to enter a suppression mode based on the first signal, and in response to determining to enter the suppression mode, generating the first control signal based on the first signal.

In some cases, the second signal is generated based on expected user activity data including calendar event data, alarm data, or both. In some cases, the first signal is generated based on a period of non-use of the electronic display.

In some cases, the method may include receiving a third signal that indicates the electronic display is predicted to be visible at a second future time before the first future time from the condition pre-processor. The method may include generating a third control signal to partially power the electronic display before the second future time based on the third signal. After the second future time, the method may include generating a fourth control signal to de-power the electronic display.

In yet another embodiment, a tangible, non-transitory, computer-readable medium may include instructions that, when executed by one or more processors, cause an electronic device to perform operations. The operations may include receiving a first signal that indicates that an electronic display of the electronic device is predicted to be visible at a first future time from a condition pre-processor.

The operations may include generating a first control signal to power the electronic display before the first future time based on the first signal and sending the first control signal to a power supply of the electronic display.

In some cases, the first signal may be generated based on a calendar entry.

In some cases, the operations may include receiving a second signal that indicates the electronic display is predicted to be visible at a second future time before the first future time from the condition pre-processor. The operations may include generating a third control signal to partially power the electronic display before the second future time based on the second signal. After the second future time, the operations may include generating a fourth control signal to de-power the electronic display.

In some cases, the operations may include generating the third control signal based on one or more sensed signals. The operations may include generating the fourth control signal based on determining that the electronic display was not suppressed in a past threshold amount of time, that the electronic display is not expected to be unsuppressed within a first threshold amount of time from the first future time, that the electronic display was not unlocked for a second threshold amount of time while suppressed, and that the electronic display was not unlocked a threshold number of times while suppressed.

In some cases, the operations may include generating the first control signal based on determining that the electronic display was suppressed in a past threshold amount of time, determining that the electronic display is expected to be unsuppressed within a first threshold amount of time from the first future time, determining that the electronic display was unlocked for a second threshold amount of time while suppressed, determining that the electronic display was unlocked a threshold number of times while suppressed, or any combination thereof.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings described below in which like numerals refer to like parts.

FIG. 8 is a flowchart of a method that may be used by a suppression management system of FIG. 7 when determining to enter and/or exit a suppression operational mode, in accordance with an embodiment;

FIG. 9 is a flowchart of a method that may be used by the suppression management system of FIG. 7 when determining to exit a suppression operational mode, in accordance with an embodiment;

DETAILED DESCRIPTION OF SPECIFIC EMBODIMENTS

Figure 1:
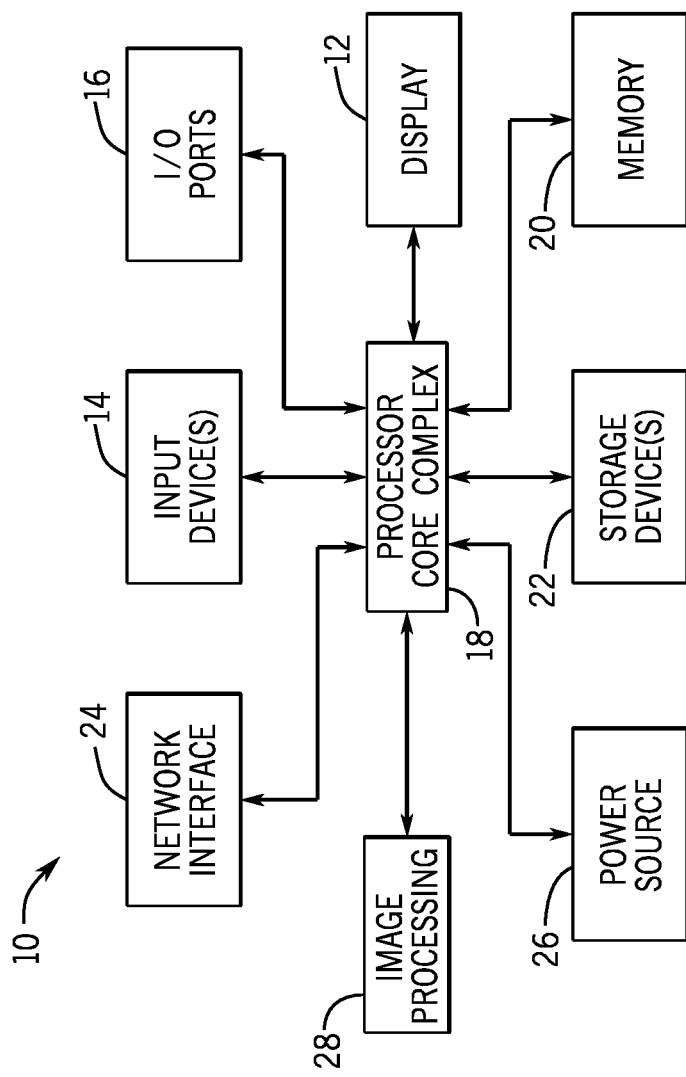
FIG. 1 is a schematic block diagram of an electronic device, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the particular features, structures, or characteristics may be combined in any suitable manner in one or more embodiments. Use of the terms "approximately," "near," "about," "close to," and/or "substantially" should be understood to mean including close to a target (e.g., design, value, amount), such as within a margin of any suitable or contemplatable error (e.g., within 0.1% of a target, within 1% of a target, within 5% of a target, within 10% of a target, within 25% of a target, and so on). Moreover, it should be understood that any exact values, numbers, measurements, and so on, provided herein, are contemplated to include approximations (e.g., within a margin of suitable or contemplatable error) of the exact values, numbers, measurements, and so on.

This disclosure is directed to controlling an electronic display of an electronic device operating in an always-on display mode to reduce an overall power consumed by the electronic device. To elaborate, the electronic device may be configurable into an always-on display mode. While on and operating in the always-on display mode, the electronic device may continuously display image frames. The images frames presented may be de-contented image frames. For example, instead of fully displaying a normally configured welcome screen, the electronic display may merely present a slow updating clock, a reduced number of widgets relative to a normal mode, one or two digital contented items v. three or more digital contented items, or the like. This operation may improve user experience but at the expense of battery consumption. Indeed, the electronic device operating in the always-on display mode displays one or more image frames while the electronic device may otherwise be idle or off. While this may be desired when the display is visible to a user, the always-on display presenting image frames while out of visibility of the user may be undesired due to the power costs associated with the operation. Thus, it may be desired to maximize an amount of time that the electronic display is perceivable by a user as always-on while minimizing overall amounts of power consumed by doing so.

Embodiments herein provide various apparatuses and techniques to reduce power consumed by the electronic device operating in an always-on display operational mode while maintaining the perception that the electronic display continues to operate with an always-on display. To do so, the embodiments disclosed herein use a suppression management system and a condition pre-processor to control when the electronic display is powered on and when the electronic display is powered off. The suppression management system may receive a condition indication from the condition pre-processor. If the condition indication indicates that the electronic display not visible by a user, the suppression management system may instruct a display power supply to remove power from the electronic display, thereby reducing an amount of power consumed by the electronic display when the electronic display is not visible by a user while operating in the always-on display operational mode. In some cases, the suppression management system and/or the condition pre-processor may predict when the electronic display is not going to visible by the user. The prediction may be based on a motion profile, learned habits of the user via machine learning operations, calendar data, or the like. Furthermore, these operations may be used in conjunction with a flip-book operational mode to further reduce power consumed by the electronic device while operating in the always-on display operational mode.

In some systems, a re-suppression mode may be used in combination with the suppression mode, both implemented via the suppression management system and/a condition pre-processor. The re-suppression mode may implement an intermediate power state between a low power state and an on power state from the electronic device may more expediently return to the suppression mode using fewer resources than returning to the suppression mode from the on power state. The re-suppression mode may be preferred to a full exit from the suppression mode in situations where a user is minimally interacting with the electronic device. For example, the re-suppression mode may be used a user wakes up in the middle of sleeping to check the time. This use-case may not warrant a full return to power since the electronic device may present a de-contented image frame. There may be an existing window of time prediction for when the user was expected to wake up. Within this existing time prediction, if an interaction with the electronic device is detected, the electronic device may be operated into the re-suppression mode to present the de-content image frame and to determine whether to fully power on the electronic display or to return to the suppression mode. Certain interactions may be monitored as conditions to base this re-suppression or exit determination on. For example, occurrences or times of interactions with the electronic device, whether the time of interaction falls within certain time periods from a start or end time of the existing time prediction, a type of interaction with the electronic device, unpredicted sensing data being detected (e.g., sudden audio, ambient light, and/or motion inputs being detected), or the like, may be used to determine whether to re-suppress or fully power on the electronic device. These determinations may be made using one or more sensors of the electronic device and/or using one or more predictions made by processing circuitry of the electronic device.

With the preceding in mind and to help illustrate, an electronic device 10 including an electronic display 12 is shown in FIG. 1. As is described in more detail below, the electronic device 10 may be any suitable electronic device, such as a computer, a mobile phone, a portable media device, a tablet, a television, a virtual-reality headset, a wearable device such as a watch, a vehicle dashboard, or the like. Thus, it should be noted that FIG. 1 is merely one example of a particular implementation and is intended to illustrate the types of components that may be present in an electronic device 10.

The electronic device 10 includes the electronic display 12, one or more input devices 14, one or more input/output (I/O) ports 16, a processor core complex 18 having one or more processing circuitry(s) or processing circuitry cores, local memory 20, a main memory storage device 22, a network interface 24, a power source 26 (e.g., power supply), and image processing circuitry 28. The various components described in FIG. 1 may include hardware elements (e.g., circuitry), software elements (e.g., a tangible, non-transitory computer-readable medium storing executable instructions), or a combination of both hardware and software elements. It should be noted that the various depicted components may be combined into fewer components or separated into additional components. For example, the local memory 20 and the main memory storage device 22 may be included in a single component. It is noted that the image processing circuitry 28 (e.g., a graphics processing unit) may sometimes be included in the processor core complex 18.

The processor core complex 18 is operably coupled with local memory 20 and the main memory storage device 22. Thus, the processor core complex 18 may execute instructions stored in local memory 20 or the main memory storage device 22 to perform operations, such as generating or transmitting image data to display on the electronic display 12. As such, the processor core complex 18 may include one or more general purpose microprocessors, one or more application specific integrated circuits (ASICs), one or more field programmable logic arrays (FPGAs), or any combination thereof.

In addition to program instructions, the local memory 20 or the main memory storage device 22 may store data to be processed by the processor core complex 18. Thus, the local memory 20 and/or the main memory storage device 22 may include one or more tangible, non-transitory, computer-readable media. For example, the local memory 20 may include random access memory (RAM) and the main memory storage device 22 may include read-only memory (ROM), rewritable non-volatile memory such as flash memory, hard drives, optical discs, or the like.

The network interface 24 may communicate data with another electronic device 10 or a network. The network interface 24 may include, for example, one or more interfaces for a personal area network (PAN), such as an ultra-wideband (UWB) or a BLUETOOTH® network, a local area network (LAN) or wireless local area network (WLAN), such as a network employing one of the IEEE 802.11x family of protocols (e.g., WI-FTC)), and/or a wide area network (WAN), such as any standards related to the Third Generation Partnership Project (3GPP), including, for example, a $3^{rd}$ generation (3G) cellular network, universal mobile telecommunication system (UMTS), $4^{th}$ generation (4G) cellular network, long term evolution (LTE®) cellular network, long term evolution license assisted access (LTE-LAA) cellular network, $5^{th}$ generation (5G) cellular network, and/or New Radio (NR) cellular network, a $6^{th}$ generation (6G) or greater than 6G cellular network, a satellite network, a non-terrestrial network, and so on. In particular, the network interface 24 may include, for example, one or more interfaces for using a cellular communication standard of the 5G specifications that include the millimeter wave (mm-Wave) frequency range (e.g., 24.25-300 gigahertz (GHz)) that defines and/or enables frequency ranges used for wireless communication. The network interface 24 of the electronic device 10 may allow communication over the aforementioned networks (e.g., 5G, WI-FIC, LTE-LAA, and so forth). The network interface 24 may also include one or more interfaces for, for example, broadband fixed wireless access networks (e.g., WIMAX®), mobile broadband Wireless networks (mobile WIMAX®), asynchronous digital subscriber lines (e.g., ADSL, VDSL), digital video broadcasting-terrestrial (DVB-T®) network and its extension DVB Handheld (DVB-H®) network, ultra-wideband (UWB) network, alternating current (AC) power lines, and so forth.

The power source 26 may provide electrical power to one or more components in the electronic device 10, such as the processor core complex 18 or the electronic display 12. Thus, the power source 26 may include any suitable source of energy, such as a rechargeable lithium polymer (Li-poly) battery or an alternating current (AC) power converter.

The I/O ports 16 may enable the electronic device 10 to interface with other electronic devices. For example, when a portable storage device is connected, the I/O port 16 may enable the processor core complex 18 to communicate data with the portable storage device. In some embodiments, the I/O ports 16 may enable a hardwired connection for charging and/or content manipulation using a standard connector and protocol, such as the Lightning connector provided by Apple Inc. of Cupertino, California, a universal serial bus (USB), or other similar connector and protocol.

The input devices 14 may enable user interaction with the electronic device 10, for example, by receiving user inputs via a button, a keyboard, a mouse, a trackpad, a touch sensing, or the like. The input device 14 may include touch-sensing components (e.g., touch control circuitry, touch sensing circuitry) in the electronic display 12. The touch sensing components may receive user inputs by detecting occurrence or position of an object touching the surface of the electronic display 12.

In addition to enabling user inputs, the electronic display 12 may be a display panel with one or more display pixels. For example, the electronic display 12 may include a self-emissive pixel array having an array of one or more of self-emissive pixels. The electronic display 12 may include any suitable circuitry (e.g., display driver circuitry) to drive the self-emissive pixels, including for example row driver and/or column drivers (e.g., display drivers). Each of the self-emissive pixels may include any suitable light emitting element, such as a LED or a micro-LED, one example of which is an OLED. However, any other suitable type of pixel, including non-self-emissive pixels (e.g., liquid crystal as used in liquid crystal displays (LCDs), digital micromirror devices (DMD) used in DMD displays) may also be used. The electronic display 12 may control light emission from the display pixels to present visual representations of information, such as a graphical user interface (GUI) of an operating system, an application interface, a still image, or video content, by displaying frames of image data. To display images, the electronic display 12 may include display pixels implemented on the display panel. The display pixels may represent sub-pixels that each control a value of one color component (e.g., red, green, or blue for an RGB pixel arrangement or red, green, blue, or white for an RGBW arrangement).

The electronic display 12 may display an image by controlling pulse emission (e.g., light emission) from its display pixels based on pixel or image data associated with corresponding image pixels (e.g., points) in the image. In some embodiments, pixel or image data may be generated by an image source (e.g., image data, digital code), such as the processor core complex 18, a graphics processing unit (GPU), or an image sensor. Additionally, in some embodiments, image data may be received from another electronic device 10, for example, via the network interface 24 and/or an I/O port 16. Similarly, the electronic display 12 may display an image frame of content based on pixel or image data generated by the processor core complex 18, or the electronic display 12 may display frames based on pixel or image data received via the network interface 24, an input device 14, or an I/O port 16.

The electronic display 12 may operably couple to the processor core complex 18 and the image processing circuitry 28. The image processing circuitry 28 may include hardware, software, or both and may process the image data to prepare the image data for presentation via the electronic display 12. In some cases, the image processing circuitry 28 may be programmed by loading a pipeline configuration from a configuration register, where the pipeline configuration may include indications for register values, settings, image processing instructions, and the like. When applied, the image processing circuitry 28 may be programmed to process the image data according to parameters defined in the pipeline configuration.

Figure 2:
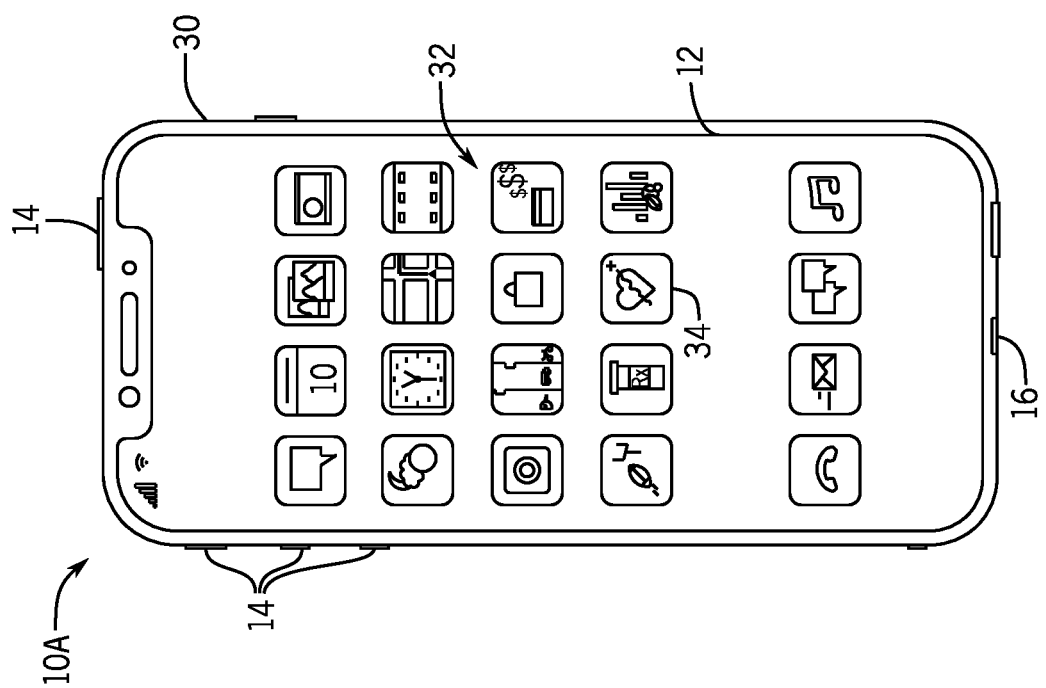
FIG. 2 is a front view of a mobile phone representing an example of the electronic device of FIG. 1, in accordance with an embodiment.

The electronic device 10 may be any suitable electronic device. To help illustrate, an example of the electronic device 10, a handheld device 10A, is shown in FIG. 2. The handheld device 10A may be a portable phone, a media player, a personal data organizer, a handheld game platform, or the like. For illustrative purposes, the handheld device 10A may be a smart phone, such as any IPHONE® model available from Apple Inc.

The handheld device 10A includes an enclosure 30 (e.g., housing). The enclosure 30 may protect interior components from physical damage or shield them from electromagnetic interference, such as by surrounding the electronic display 12. The electronic display 12 may display a graphical user interface (GUI) 32 having an array of icons. When an icon 34 is selected either by an input device 14 or a touch-sensing component of the electronic display 12, an application program may launch.

The input devices 14 may be accessed through openings in the enclosure 30. The input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, or toggle between vibrate and ring modes.

Figure 3:
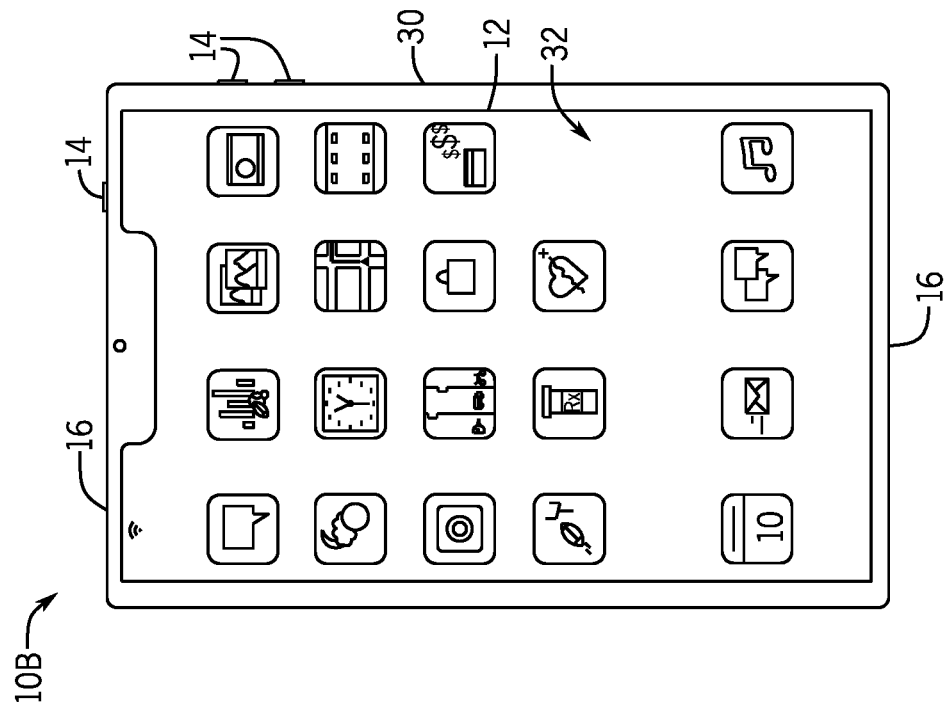
FIG. 3 is a front view of a tablet device representing an example of the electronic device of FIG. 1, in accordance with an embodiment.
Figure 4:
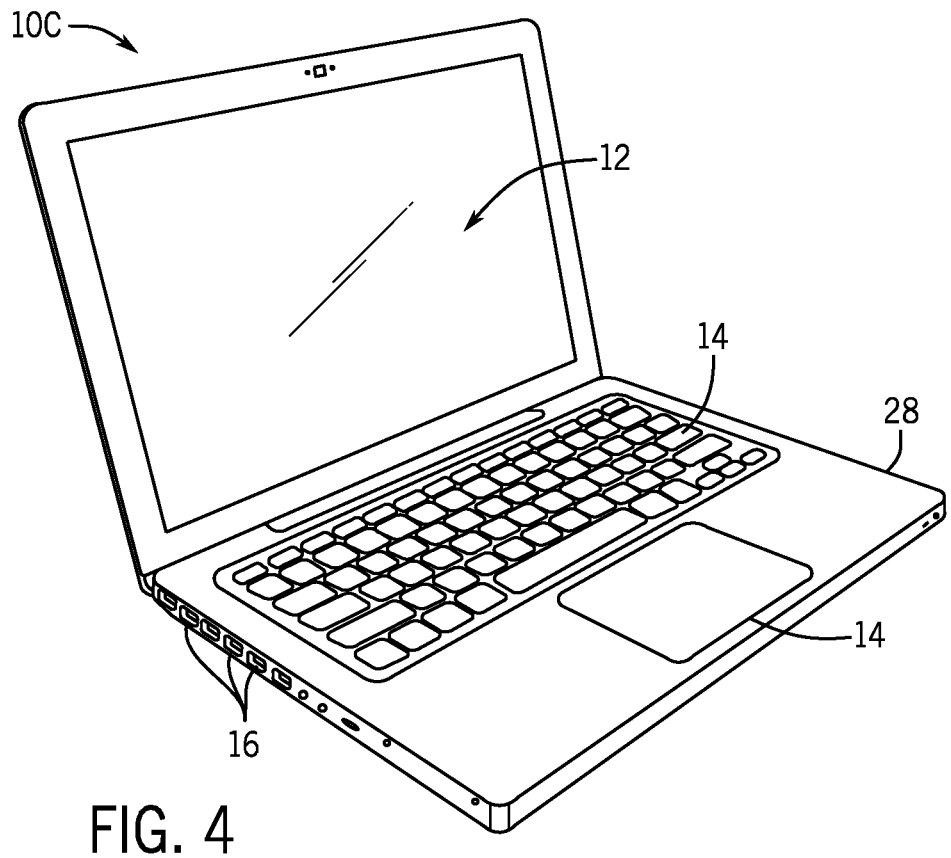
FIG. 4 is a front view of a notebook computer representing an example of the electronic device of FIG. 1, in accordance with an embodiment.
Figure 5:
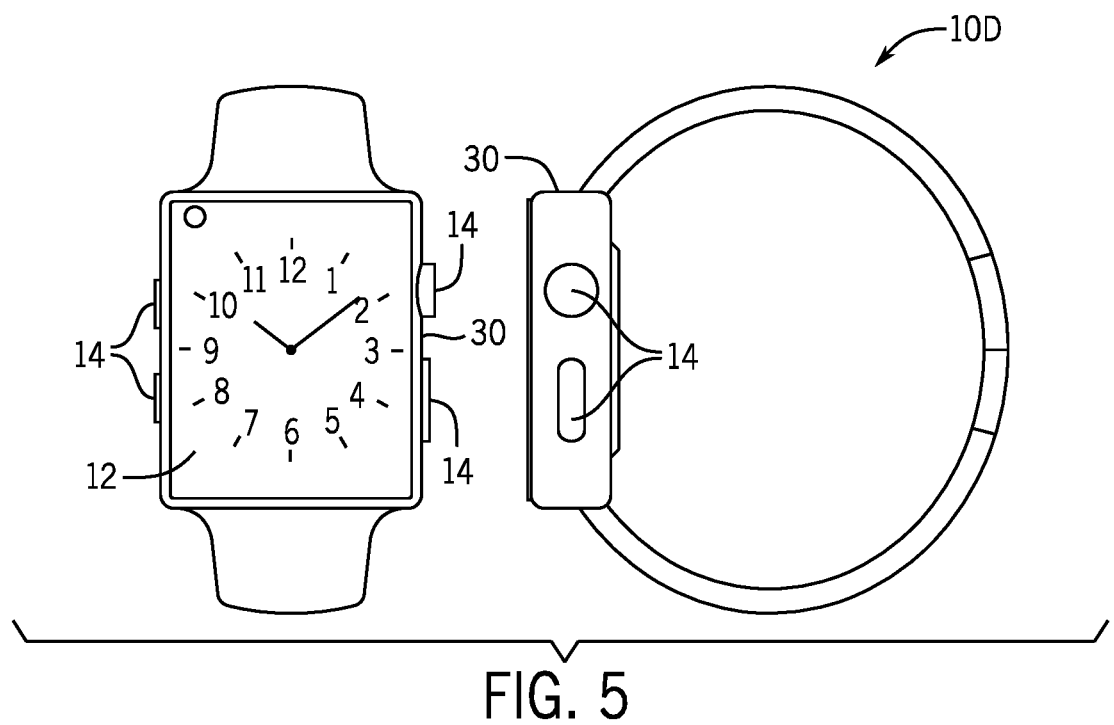
FIG. 5 are front and side views of a watch representing an example of the electronic device of FIG. 1, in accordance with an embodiment.

Another example of a suitable electronic device 10, specifically a tablet device 10B, is shown in FIG. 3. The tablet device 10B may be any IPAD® model available from Apple Inc. A further example of a suitable electronic device 10, specifically a computer 10C, is shown in FIG. 4. For illustrative purposes, the computer 10C may be any MACBOOK® or IMAC® model available from Apple Inc. Another example of a suitable electronic device 10, specifically a watch 10D, is shown in FIG. 5. For illustrative purposes, the watch 10D may be any APPLE WATCH® model available from Apple Inc. As depicted, the tablet device 10B, the computer 10C, and the watch 10D each also includes an electronic display 12, input devices 14, I/O ports 16, and an enclosure 30. The electronic display 12 may display a GUI 32. Here, the GUI 32 shows a visualization of a clock. When the visualization is selected either by the input device 14 or a touch-sensing component of the electronic display 12, an application program may launch, such as to transition the GUI 32 to presenting the icons 34 discussed in FIGS. 2 and 3.

Figure 6:
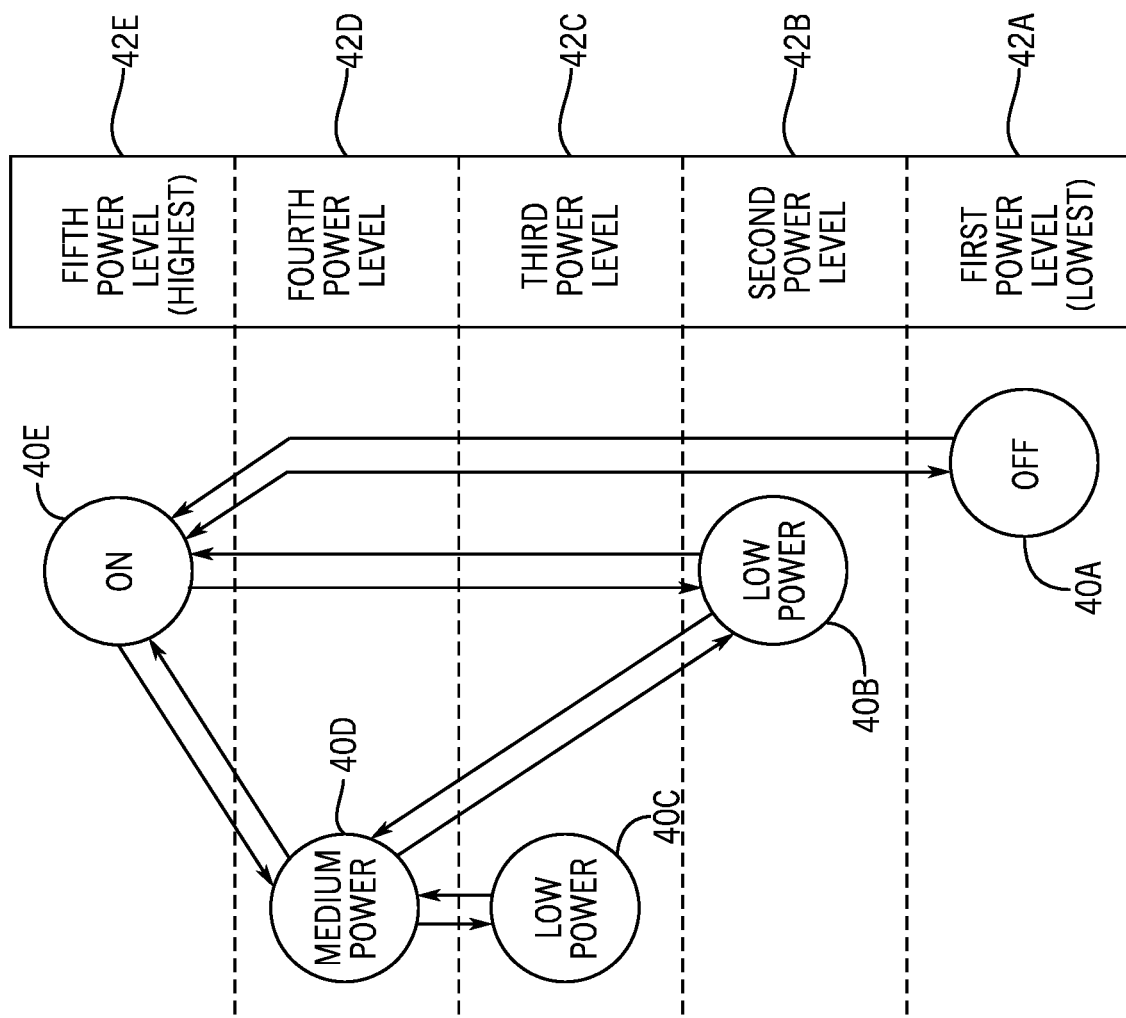
FIG. 6 is a diagrammatic representation of example power states of the electronic device of FIG. 1, in accordance with an embodiment.

With the foregoing in mind, the electronic device 10 may selectively power on and off different portions to reduce a power consumed overall. To elaborate, FIG. 6 is a diagrammatic representation that compares different power states 40 (power state 40A, power state 40B, power state 40C, power state 40D, power state 40E) of the electronic device 10, relative power consumption levels 42 (level 42A, level 42B, level 42C, level 42D, level 42E) of the electronic device 10, and the transitions between the different power states 40 that may be implemented by the electronic device 10.

The power state 40A may correspond to an off state having a first power level 42A corresponding to a lowest power consumption level (e.g., 0). The electronic device 10 may be in the power state 40A while powered off or disconnected from a power supply. In power state 40A, no sensors may be usable. Conversely, the power state 40E may correspond to a full power, on state having a fifth power level 42E, which is a highest power consumption level. In power state 40E, all sensors and systems may be usable. The electronic device 10 may be in the power state 40E while powered on and actively rendering image frames while in a normal operational mode and not operated in an always-on display mode.

To save power, the electronic device 10 may transition into an always-on display operational mode, which may enable one or more systems of the electronic device 10 to power off and cause the electronic device 10 to transition into the power state 40D. The power state 40D may correspond to a first medium power state having a fourth power level 42D corresponding to a second highest power consumption level. While in the power state 40D, some sensors may be usable while some sensors may be off. For example, an accelerometer and an inertial measurement unit (IMU) may be operating but some systems of the electronic device 10 as a whole may be off, such as an image source.

While the always-on display operational mode may be desirable, it may cause the electronic device 10 to consume power even when the electronic display 12 is not visible. Thus, selectively controlling the electronic display 12 to power off while the electronic device 10 remains in the always-on display operational mode may reduce power consumed. However, merely powering off the electronic display 12 may be perceived by a user that the electronic display 12 is indeed not an always-on display. Thus, a suppression operational mode may be used to suppress or permit the electronic display 12 to present an image frame based on when a user is predicted or expected to view the electronic display 12.

Thus, to save even more power, the electronic device 10 may transition into a first suppression operational mode while in the always-on display operational mode, which may enable the electronic device 10 to also power off the electronic display 12 and cause the electronic device 10 to transition into the power state 40C. The power state 40C may correspond to a second medium power state having a third power level 42C corresponding to a third lowest power consumption level. The power state 40C may correspond to an operational mode where the electronic display 12 is off (e.g., suppressed) and a queue of image frames (e.g., flipbook) is proceeding through the respective image frames as scheduled. At exit from the operational mode, the electronic display 12 may pick up and present a current or next image frame from the queue of image frames. Additionally or alternatively, the electronic device 10 may transition into a second suppression operational mode while in the always-on display operational mode, which may enable the electronic device 10 to power off the electronic display 12 and an image source, transitioning the electronic device 10 into the power state 40B. The power state 40B may correspond to a second lowest power state having a second power level 42B corresponding to a second lowest power consumption level. While in the second suppression operational mode, the electronic device 10 may power off the image source in response to one or more image frames being pre-rendered and stored for access by the image processing circuitry 28. At exit from the second suppression operational, the electronic device 10 may discard the queued image frames and return to presenting actively rendered image frames and/or may continue presenting the queued image frames in the event that content of the image frames remains relevant. In the power state 40B, some sensors may be usable. For example, an accelerometer and an inertial measurement unit (IMU) may be operating but the electronic device 10 as a whole may be off.

The power state 40B and the power state 40C may be respectively entered into based on an expected power-off time period—in other words, if the electronic device 10 is expected to be in one of the suppressed operational modes for longer than a duration of time threshold, the second suppression operational mode may be used. The first suppression operational mode may be used in cases where the electronic device 10 is expected to be in one of the suppressed operational modes for shorter than or equal to a duration of time threshold.

Figure 7:
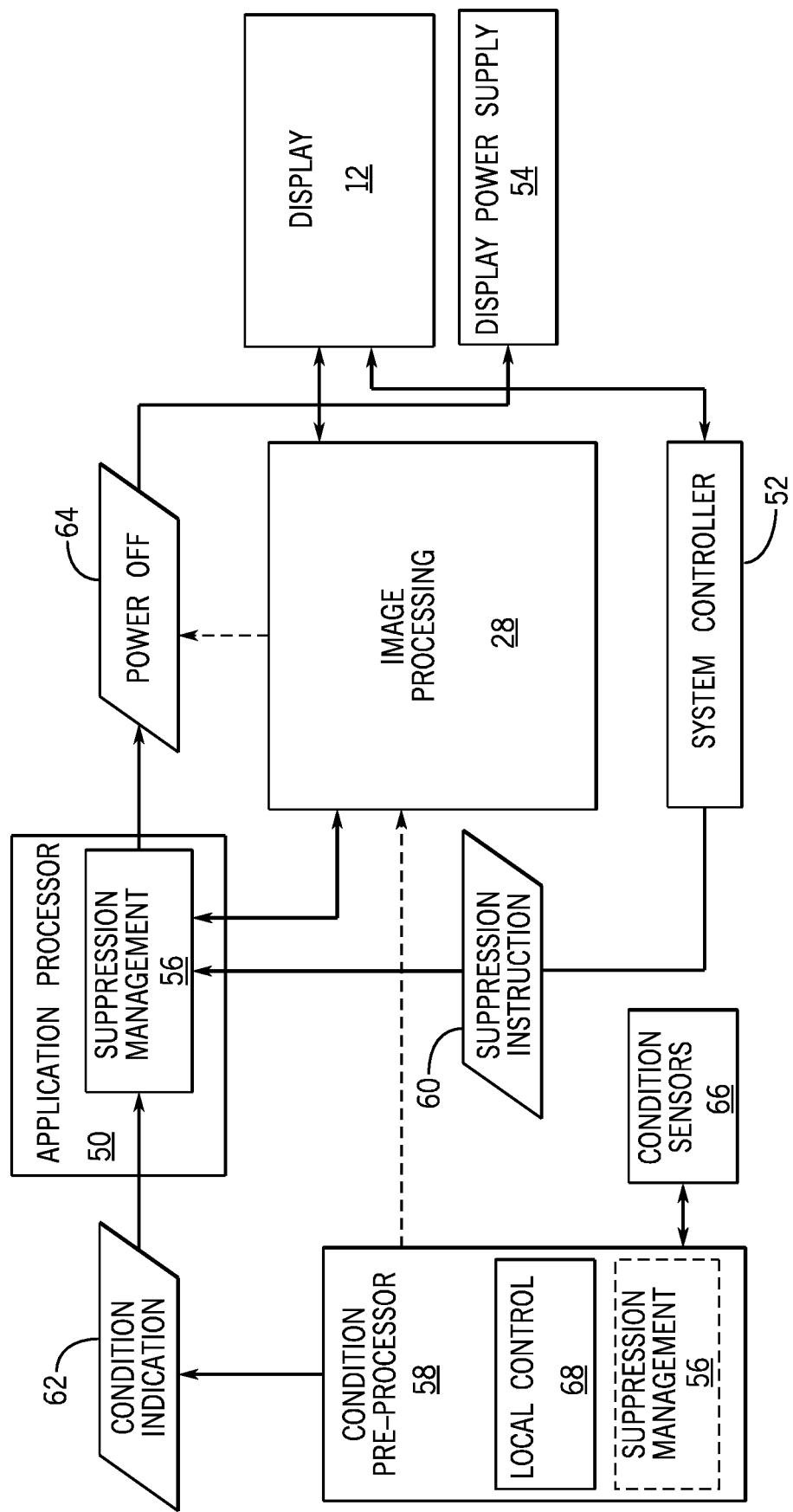
FIG. 7 is a block diagram of a portion of the electronic device of FIG. 1, in accordance with an embodiment.

FIG. 7 is a block diagram of a portion of the electronic device 10 that includes the image processing circuitry 28 and the electronic display 12. The image processing circuitry 28 may be coupled to an application processor 50, a system controller 52, and the electronic display 12. The electronic display 12 may be powered by a display power supply 54, which may be supplied power from a larger system power supply (not illustrated) like a power management integrated circuit (PMIC) and/or a battery that supplies the other circuitry of the electronic device 10. The application processor 50 may include a suppression management system 56 communicatively coupled to a condition pre-processor 58. The application processor 50 may generate image data and may send the image data to the image processing circuitry 28 for processing prior to being sent to and presented via the electronic display 12. In some cases, the application processor may generate the configuration data to program the processing performed by the image processing circuitry 28, including configuration data to change a brightness or a characteristic of light that the image data is processed according to, a refresh rate used to control the electronic display 12, or the like. Since the application processor 50 generates image data, the application processor 50 may also generate the one or more image frames to be presented via the electronic display during an always-on display operational mode. The system controller 52 may control operations of the image processing circuitry 28, display drivers of the electronic display 12, memory 20 of FIG. 1 and/or other portions of the electronic device 10. It is noted that the image processing circuitry 28 and/or the processor core complex 18 may include the system controller 52 as opposed to the system controller 52 being external to both.

The suppression management system 56 may determine to enter a suppression operational mode (e.g., the first suppression operational mode, the second suppression operational mode) based on a suppression instruction 60, a condition indication 62, or both. The condition indication 62 may communicate to the suppression management system 56 when conditions are suitable to trigger the suppression operational mode, such as when a user of the electronic device 10 is detected as away from the electronic display 12, when the electronic display 12 is not visible (face-down, in bag), or when a calendar entry or alarm indicates that the suppression operational mode may be used. As another example, an accelerometer may be used to identify a pattern of a motion that corresponds to the electronic display 12 being in a bag, face-down, or otherwise obstructed. Thus, the condition indication 62 may be generated in response to the accelerometer detecting a change in the pattern of motion, which may indicate that the electronic display 12 is about to be or is expected to be visible. The suppression instruction 60 may be used to verify that the suppression operational mode may be entered when conditions are suitable as indicated via sensed data. In some cases, the suppression instruction 60 is used to trigger the suppression operational mode regardless of the condition indication 62, such as when an operator instructs the suppression operational mode and/or when a setting or parameter of the electronic device 10 corresponds to entering the suppression operational mode (e.g., the electronic device 10 detecting that it is in a car and entering into a do-not-disturb operational mode with temporarily suppressed notification and image presentation operations).

The suppression management system 56 may determine to operate the electronic device 10 to enter the suppression operational mode based on a condition indication 62 from the condition pre-processor 58. In response to determining to enter the suppression operational mode, the suppression management system 56 may power off the electronic display 12. For example, the suppression management system 56 may generate a power-off control signal 64 and send the power-off control signal 64 to the display power supply 54, which may stop a supply of power to the electronic display 12.

The system controller 52 may generate the suppression instruction 60 in response to conditions being met to permit the electronic display 12 to be powered off. For example, the system controller 52 may generate the suppression instruction 60 in response to receiving an input instructing the electronic device 10 to enter a suppression operational mode. The input may be received via one or more of the input devices 14, via a tactile input to the electronic display 12 indicating a focus mode, a sleep mode, a do-not-disturb mode, from an operating system associated with the processor core complex 18 indicating that a low power mode is to be entered, or the like. In response to any of these, the system controller 52 may generate the suppression instruction 60 to indicate to the suppression management system 56 that, when conditions permit, to power-off the electronic display 12. FIGS. 8-9 further describe operations associated with entering and exiting the suppression operational mode.

The condition pre-processor 58 may generate the condition indication 62 based on a variety of factors, as will be appreciated. To do so, the condition pre-processor 58 may include one or more condition sensors 66 (e.g., sensors, sensing devices) and local control circuitry 68. The local control circuitry 68 may receive sensing data from the one or more condition sensors 66 and may process the sensing data to determine to generate the condition indication 62. The local control circuitry 68 may use thresholds to determine at what value of sensing data should the condition indication 62 be generated. Example condition sensors 66 include an inertial measurement unit (IMU), a proximity sensor, an ambient light sensor, a radio frequency (RF) sensor (e.g., an antenna to receive RF signals used to detect a proximity of a second electronic device 10), a pressure sensor (e.g., a barometer), a temperature sensor, an ultrasound sensor, an infrared sensor, a motion detecting sensor, a gyroscope, a photodector, an accelerometer, a humidity sensor, an audio sensor, or the like. In some cases, one or more RF sensors may be used to perform direct proximity measure through time of flight calculations or may be used to perform signal strength sensing as a proxy for direct proximity sensing. Ultra-wideband (UWB) interfaces and RF sensors may be used to perform the direct proximity sensing while received signal strength indicator (RSSI) sensing interfaces (e.g., BLUETOOTH® interface, WI-FI® interface) may be used to perform the signal strength sensing-based proximity sensing. In some cases, the two methods may be combined. For example, RSSI sensing interfaces may be used to determine whether an additional electronic device 10 is nearby and then UWB interfaces may be used to determine an exact distance between the electronic device 10 and the additional electronic device 10. Using RSSI sensing interfaces may consume less power than UWB interfaces to perform a similar determination, and thus may be preferred in certain circumstances. In some cases, sensors may enable a face-identifier (ID) or other biometric identifier sensors to generate the condition indication 62. Sensors may be included on one or more faces or sides of the electronic device 10, such as to detect ambient light on a front and back of the electronic device 10.

Although the above describes that the application processor 50 includes the suppression management system 56, it may be desired to initiate the display power off operation without the application processor 50. Generating the power-off control signal 64 without the application processor 50 may save even more power when compared to doing so based on the application processor 50. Thus, sometimes the suppression management system 56 may be included in the condition pre-processor 58, thereby enabling the application processor 50 to be at least partially off while the suppression management system 56 is determining to enter and/or causing the display power off operation via the power-off control signal 64. This option is show with the dashed lines in FIG. 7. Indeed, the condition pre-processor 58 may transmit the power-off control signal 64 from the suppression management system 56 to the image processing circuitry 28, which transmits the power-off control signal 64 to the display power supply 54 to instruct the display power off operation.

Keeping the foregoing in mind, FIG. 8 is a flowchart of a method 80 for the suppression management system 56 to use when determining to enter and exit the suppression operational mode. Any suitable device (e.g., a controller) that may control one or more components of the electronic device 10, such as the processor core complex 18, may perform the method 80. In some embodiments, the method 80 may be implemented by executing instructions stored in a tangible, non-transitory, computer-readable medium, such as the memory 20 or storage 22, using the processor core complex 18. For example, the method 80 may be performed at least in part by one or more software components, such as an operating system of the electronic device 10, one or more software applications of the electronic device 10, and the like. While the method 80 is described using steps in a specific sequence, it should be understood that the present disclosure contemplates that the described steps may be performed in different sequences than the sequence illustrated, and certain described steps may be skipped or not performed altogether.

Figure 10:
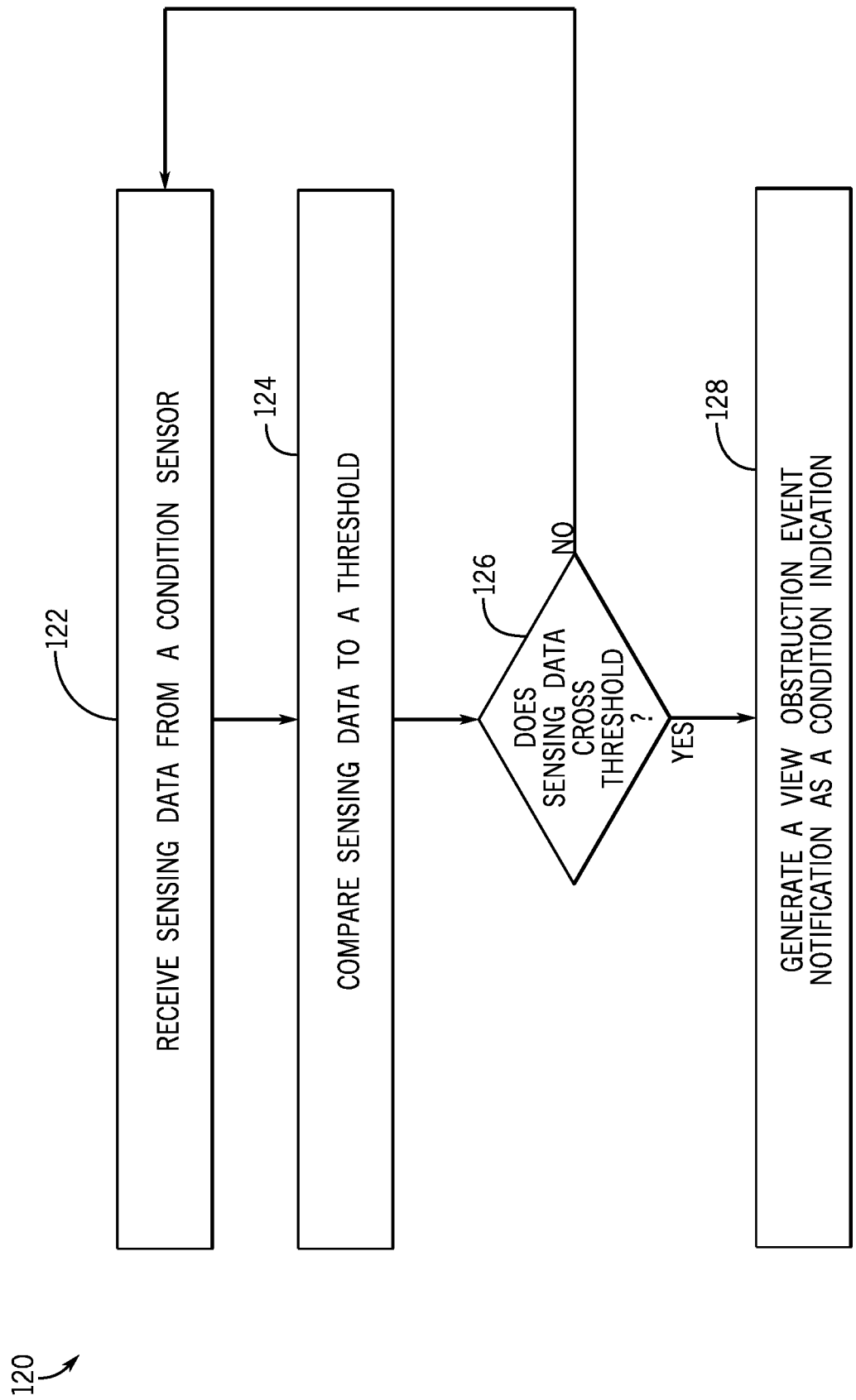
FIG. 10 is a flowchart of a first example method that may be used by a condition pre-processor of FIG. 7 when generating the condition indication, in accordance with an embodiment.
Figure 11:
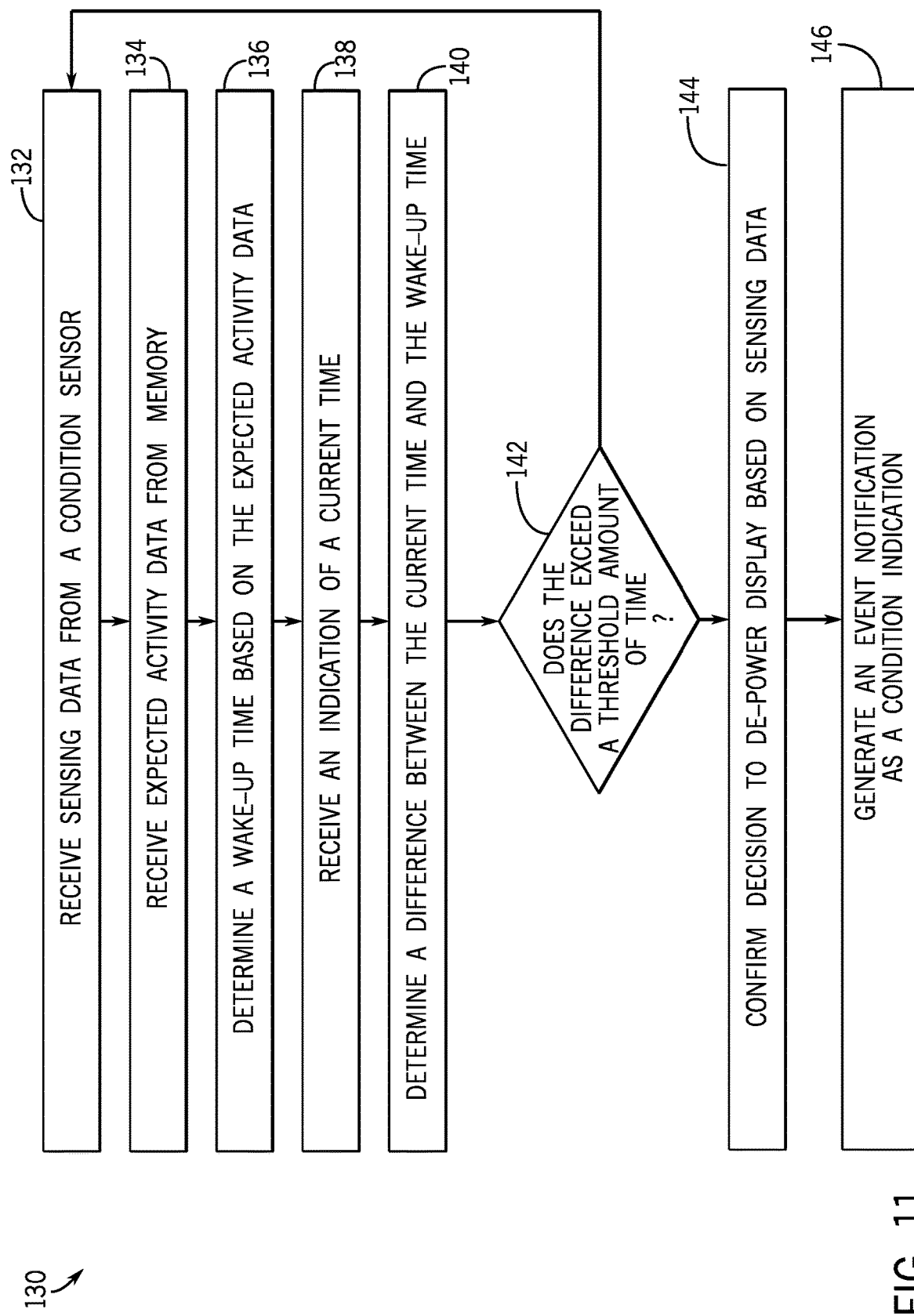
FIG. 11 is a flowchart of a second example method that may be used by a condition pre-processor of FIG. 7 when generating the condition indication, in accordance with an embodiment.
Figure 12:
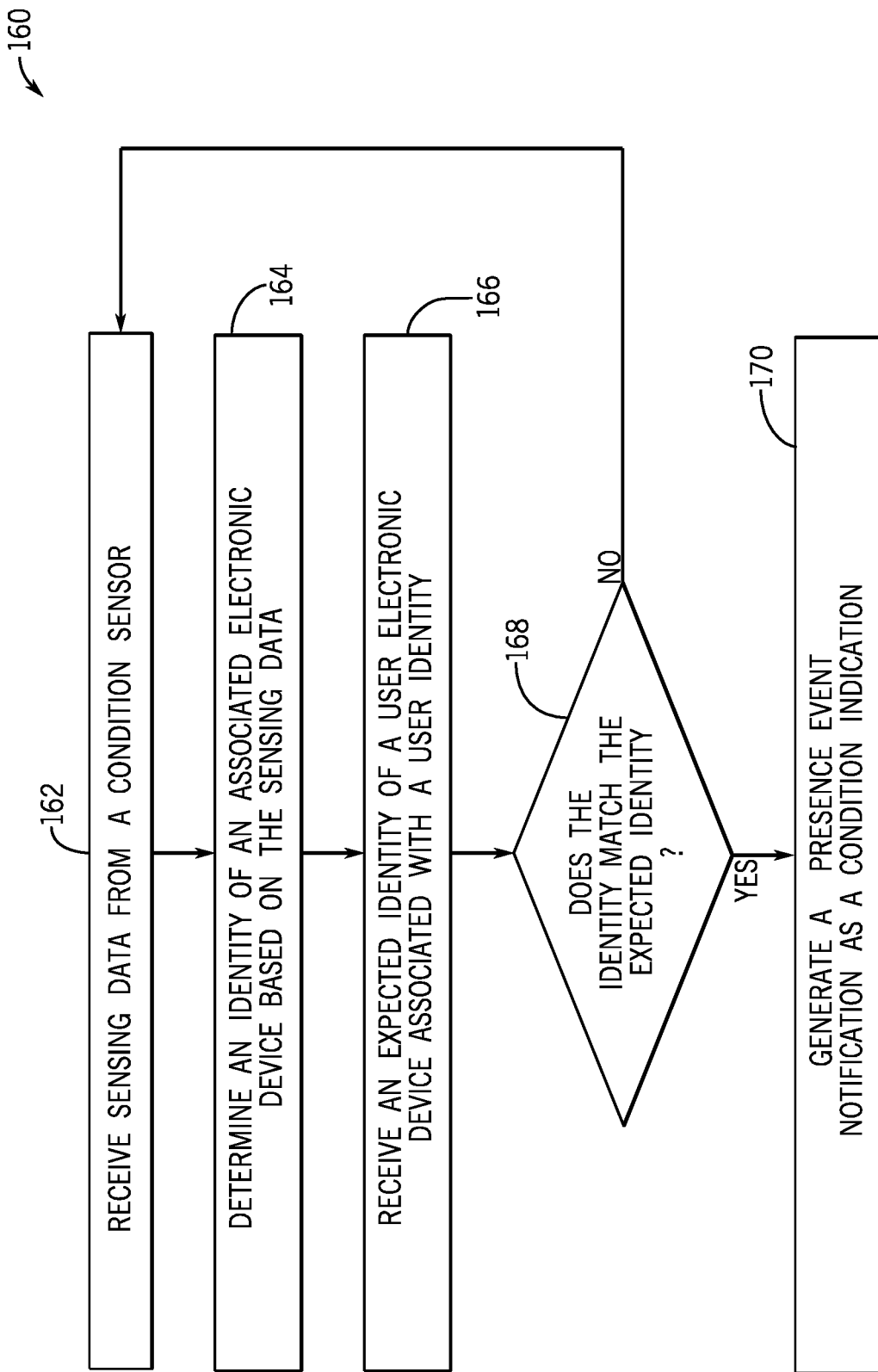
FIG. 12 is a flowchart of a third example method that may be used by a condition pre-processor of FIG. 7 when generating the condition indication, in accordance with an embodiment.

In process block 82, the suppression management system 56 receives a condition indication 62 from the condition pre-processor 58. The condition indication 62 may be a signal that indicates that the electronic display 12 is not being used. The condition pre-processor 58 may generate the condition indication 62 in response to determining a presence event based on sensing data from one or more condition sensors 66, in response to predicting that the electronic display 12 is going to be visible relatively soon, and/or in response to determining a presence event based on identifying an identity of an associated electronic device 10. Thus, the suppression management system 56 may enter the suppression operational mode in response to sensing data and the sensing data crossing thresholds corresponding to the sensing data. FIGS. 10-12 detail these example operations further. The suppression management system 56 may receive the condition indication 62 in response to accessing one or more registers or storage devices of the condition pre-processor 58. In some cases, the condition pre-processor 58 may monitor for operating conditions during which the electronic device 10 may benefit from the suppression operational mode. The different operating conditions may be detectible via sensing data. Examples of operating conditions include the electronic display 12 being face down on a table or otherwise being obstructed from view, the electronic device 10 being in a pocket or bag, a user associated with the electronic device 10 (e.g., a user corresponding to a user profile associated with and/or logged onto the electronic device 10) being asleep, away from the electronic display 12, or otherwise not expected to view the electronic display 12, or the like.

In process block 84, the suppression management system 56 receives a suppression instruction 60 from image processing circuitry 28. The image processing circuitry 28 may generate the suppression instruction 60 in response to preparatory operations being completed, which may be desired to be completed before entering the suppression operational mode. The image processing circuitry 28 may queue an image frame to be presented at exit from the suppression operational mode as part of the preparatory operations. In some cases, the image processing circuitry 28 may confirm that entering the suppression operational mode meets time duration conditions before entering the suppression operational mode as part of the preparatory operations. For example, the image processing circuitry 28 may generate the suppression instruction 60 in response to determining that the suppression operational mode is expected to be used for a duration of time that exceeds a threshold amount of time. The threshold amount of time may correspond to a minimum amount of time that, if the electronic device 10 is operated in a suppression operational mode, power saved from entering the suppression operational mode exceeds an amount of power consumed by the electronic device 10 entering the suppression operational mode.

In process block 86, the suppression management system 56 determines to enter the suppression operational mode based on the condition indication 62, the suppression instruction 60, or both. The condition indication 62 and/or the suppression instruction 60 may be assigned a greater priority over the other, and thus the suppression management system 56 may determine to enter the suppression operational mode in response to receiving the higher priority indication from the condition indication 62 and the suppression instruction 60. To enter the suppression operational mode, in process block 88, the suppression management system 56 may generate the power-off control signal 64 and send the power-off control signal 64 to the display power supply 54. Sometimes, the suppression management system 56 may scale back or stop other operations of the electronic device 10 in response to entering the suppression operational mode. For example, when in the suppression operational mode, the electronic device 10 may be operated to stop generating image frames since the electronic display 12 is being powered off or is powered off.

In process block 90, the suppression management system 56 determines to exit suppression operational mode. To enter the suppression operational mode, the suppression management system 56 determines that the electronic display 12 is not being viewed or is not visible based on one or more conditions being met. To exit the suppression operational mode, the suppression management system 56 determines that the electronic display 12 is being viewed (or visible) or is predicted to viewed (or visible) based on one or more conditions being met. The condition indication 62, when generated and sent while in the suppression operational mode, may be a first signal that indicates that the electronic display 12 is predicted to be visible at a future time. In some cases, for at least one condition met to enter the suppression operational mode, an opposite of the at least one condition may be monitored to determine when to exit the suppression operational mode. For example, if an ambient light sensor of the condition pre-processor 58 was used to detect when the electronic display 12 was in a bag, box, container, or the like, the suppression management system 56 may determine to exit the suppression operational mode based on sensing data generated via the ambient light sensor. Of course, other devices may be used as well. For example, if an ambient light sensor of the condition pre-processor 58 was used to detect when the electronic display 12 was in a bag, the suppression management system 56 may determine to exit the suppression operational mode based on sensing data generated via a different sensor, like an accelerometer or gyroscope. In some cases, the condition pre-processor 58 may generate another condition indication 62 in response to determining that sensing data indicates a condition being present to exit the suppression operational mode.

In process block 92, the suppression management system 56 generates and sends a power on instruction to a display power supply 54. The suppression management system 56 may generate the power on instruction in response to detecting the condition to exit the suppression operational mode. In this manner, the method 80 enables the electronic device 10 to reduce a total amount of power consumed by selectively powering off the electronic display 12.

FIG. 9 is a flowchart of an example method 100 for the suppression management system 56 to use when determining to exit the suppression operational mode at process block 90 of FIG. 8. Any suitable device (e.g., a controller) that may control one or more components of the electronic device 10, such as the processor core complex 18, may perform the method 100. In some embodiments, the method 100 may be implemented by executing instructions stored in a tangible, non-transitory, computer-readable medium, such as the memory 20 or storage 22, using the processor core complex 18. For example, the method 100 may be performed at least in part by one or more software components, such as an operating system of the electronic device 10, one or more software applications of the electronic device 10, and the like. While the method 100 is described using steps in a specific sequence, it should be understood that the present disclosure contemplates that the described steps may be performed in different sequences than the sequence illustrated, and certain described steps may be skipped or not performed altogether.

In process block 102, the suppression management system 56 receives a condition indication 62 from the condition pre-processor 58 indicating that the electronic display 12 is visible or is predicted to be visible. The prediction of visibility may be based on a time of expected visibility. The condition indication 62 may be generated when the time of expected visibility is within a threshold amount of time. The condition pre-processor 58 may read the threshold amount of time from the memory 20 or from the storage devices 22.

The exit condition associated with a prediction that the electronic display 12 is expected to be viewed within a duration of time may be paired with various suitable entry conditions. Indeed, the suppression management system 56 may have operated the electronic device 10 to enter the suppression operational mode in response to sensed data indicating that the electronic display 12 is not visible or is obstructed and/or in response to data stored in the memory 20 or the storage devices 22 indicating that a user is asleep, idle, or otherwise away from the electronic device 10.

In process block 104, the suppression management system 56 determines to exit the suppression operational mode based on the condition indication 62. These operations may be similar to operations performed at process block 90 and thus are relied on here. When determining to exit based on the condition indication 62, the suppression management system 56 may determine from the condition indication 62 that the exit condition is met—that is, the suppression management system 56 may determine that a user is predicted to view the display based on calendar data, alarm data, sensing data (e.g., indicating ongoing motion, a change of pressure indicating that a viewer is approaching, a change in proximity sensor output indicating that a viewer is approaching), or the like, as will be appreciated. In response to determining to exit the suppression operational mode, in process block 106, the suppression management system 56 generates and sends a power instruction to the display power supply 54 based on the condition indication 62. These operations may be similar to operations performed at process block 92 and thus are relied on here. In this manner, the method 100 enables the electronic device 10 exit the suppression operational mode in anticipation of a user viewing the electronic display 12 and/or in response to predicting that the electronic display 12 is predicted to be visible.

One example of method 100 may include an electronic device 10 entering the suppression operational mode based on the condition pre-processor 58 detecting that the electronic display 12 is in a bag or is face-down on a surface may exit the suppression operational mode in response to the suppression management system 56 determining that a calendar entry indication stored in the memory 20 or the storage devices 22 indicates that a user is expected to move the electronic device 10 to make the electronic display 12 visible within a threshold amount of time from a current time. In this example, the suppression management system 56 may generate and send a power on instruction to the display power supply 54 to cause the electronic display 12 to turn on before the user would be actually viewing the electronic display 12, thereby making the electronic device 10 be perceived as having an always-on display.

Indeed, several methods may be used to enter and/or exit the suppression operational mode. FIGS. 10-12 described three examples of these methods. It should be notes that other methods may also be validly used to selectively control the electronic display 12 in response to whether the electronic display 12 is visible, whether the electronic display 12 is visible during always-on display operational mode operations, or the like.

FIG. 10 is a flowchart of a first example method 120 that may be used by the condition pre-processor 58 when generating the condition indication 62. This may be an example method for the electronic device 10 to use when determining to enter and/or exit the suppression operational mode at process block 84 and/or at process block 90 of FIG. 8. As described here, the condition pre-processor 58 of FIG. 7 performs operations of the method 120. However, it should be noted that any suitable device (e.g., a controller) that may control one or more components of the electronic device 10, such as the processor core complex 18, may perform the method 120. In some embodiments, the method 120 may be implemented by executing instructions stored in a tangible, non-transitory, computer-readable medium, such as the memory 20 or storage 22, using the processor core complex 18. For example, the method 120 may be performed at least in part by one or more software components, such as an operating system of the electronic device 10, one or more software applications of the electronic device 10, and the like. While the method 120 is described using steps in a specific sequence, it should be understood that the present disclosure contemplates that the described steps may be performed in different sequences than the sequence illustrated, and certain described steps may be skipped or not performed altogether.

In process block 122, the condition pre-processor 58 receives sensing data from one or more condition sensors 66. One or more of the condition sensors 66 may be located internal to or external to the condition pre-processor 58 and may sense conditions internal to or external to the electronic device 10. For example, the electronic device 10 may include two temperature sensors—one to sense a temperature internal to the electronic device 10 and another to sense a temperature of an ambient environment including the electronic device 10. Description related to the condition pre-processor 58 are relied on herein from at least FIG. 7.

In process block 124, the condition pre-processor 58 compares the sensing data to a threshold and determines, in process block 126, whether the sensing data crosses the threshold. The threshold may be associated with an operating condition, a placement, or an orientation that, when satisfied, corresponds to a time or place at which the electronic display 12 may be powered off. For example, the threshold may indicate an amount of ambient light that corresponds to the electronic device 10 being in a bag. Different thresholds may be used for a same type of sensing data. For example, a first threshold may indicate a first amount of light that corresponds to the electronic device 10 being in a bag and a second threshold may indicate a second amount of light that corresponds to the electronic device 10 being in a pocket. Sometimes the threshold may be associated with a range, and thus the threshold may represent an upper limit condition or a lower limit condition and be paired with another threshold. Thresholds may be paired across different sensors as well, where for a particular operating condition, placement, or orientation to be identified, two or more thresholds may be exceeded or a range and a threshold be met. For example, the condition pre-processor 58 may determine that the electronic device 10 is face-down on a surface, and thus able to have the electronic display 12 powered off, in response to a first condition sensor 66 that senses ambient light below a first threshold (e.g., indicating darkness or a lack of light) and a second condition sensor 66 that senses motion below a second threshold (e.g., indicating stillness or a stationery device).

In response to the sensing data crossing the threshold, or otherwise indicating that an operating condition, a placement, and/or an orientation is present, in process block 128, the condition pre-processor 58 generates an condition indication 62. The condition indication 62 may indicate to the suppression management system 56 and/or the application processor 50 that the operating condition, placement, and/or orientation is met and/or present or otherwise occurring. In some cases, the condition indication 62 generated at process block 128 corresponds to a view obstruction indication, which may generally indicate to the electronic device 10 that a view of the image-presenting side of the display panel of the electronic display 12 is obstructed from viewing by a viewer. The condition pre-processor 58 may write the condition indication 62 to memory 20, storage 22, or a register accessible by the suppression management system 56 so that the suppression management system 56 is able to read the condition indication 62. In some cases, the condition pre-processor 58 may transmit the condition indication 62 to the suppression management system 56 after generating the condition indication 62 or in response to a request from the suppression management system 56. The reception of the condition indication 62 may cause the suppression management system 56 to perform operations of method 80 of FIG. 8.

In response to the sensing data not crossing the threshold, or otherwise indicating that the operating condition, the placement, and/or the orientation is present, in process block 124, the condition pre-processor 58 may proceed to repeat operations of process block 122 and receive additional sensing data from one or more of the condition sensors 66. The condition pre-processor 58 may proceed to repeat operations of process block 122 and/or of method 120 on an ongoing basis and/or on an interval or periodic basis, such as every 1, 2, 3 . . . N minutes or in accordance with another time periodicity definition. In this manner, the method 120 enables the electronic device 10 to generate the condition indication 62 used to trigger an entering into the suppression operational mode in response to determining that the electronic display 12 is not visible or is not being viewed by a viewer and/or trigger an exiting from the suppression operational mode in anticipation of a user viewing the electronic display 12 and/or in response to predicting that the electronic display 12 is predicted to be visible.

As another example, FIG. 11 is a flowchart of a second example method 130 that may be used by the condition pre-processor 58 when generating the condition indication 62. This may be an example method for the electronic device 10 to use when determining to enter and/or exit the suppression operational mode at process block 84 and/or at process block 90 of FIG. 8. As described here, the condition pre-processor 58 of FIG. 7 performs operations of the method 130. However, it should be noted that any suitable device (e.g., a controller) that may control one or more components of the electronic device 10, such as the processor core complex 18, may perform the method 130. In some embodiments, the method 130 may be implemented by executing instructions stored in a tangible, non-transitory, computer-readable medium, such as the memory 20 or storage 22, using the processor core complex 18. For example, the method 130 may be performed at least in part by one or more software components, such as an operating system of the electronic device 10, one or more software applications of the electronic device 10, and the like. While the method 130 is described using steps in a specific sequence, it should be understood that the present disclosure contemplates that the described steps may be performed in different sequences than the sequence illustrated, and certain described steps may be skipped or not performed altogether.

In process block 132, the condition pre-processor 58 receives sensing data from the one or more condition sensors 66. For sake of concise description, these operations are similar to those of process block 122 of FIG. 10 and thus are relied on herein.

In process block 134, the condition pre-processor 58 receives expected activity data from memory, such as the memory 20 and/or storage 22. The expected activity data may include calendar data, alarm data, or the like, such as calendar entry indications or programmed alarm indications that indicate to the local control circuitry 68 a setting or input data related to a future event (e.g., event stored in association with a calendar; a future desire alarm output). The expected activity data may correspond to an occurrence time, which may be a scheduled or indicated time at which the future event is to occur, is expected to occur, and/or is intended to occur. A machine learning engine system may generate the expected activity data based on monitored patterns of use associated with the electronic device 10 and/or the electronic display 12. For example, a viewer may wake up a duration of time prior to a set alarm for a threshold number of times, and in response to the monitored pattern, the machine learning engine may identify that the viewer wakes up the duration of time prior to the set alarm and use that as an expected activity data when determining to enter or exit from the suppression operational mode.

In process block 136, the condition pre-processor 58 may determine a wake-up time based on the expected activity data, the occurrence time, and/or the time duration. In this way, the condition pre-processor 58 may identify the occurrence time that the expected activity data corresponds to and identify a latest time by which the electronic display 12 should be powered on. The latest time may correspond to a time that is a time duration prior to the occurrence time in cases where the electronic display 12 is viewed prior to the expected occurrence time. From the latest time, the condition pre-processor 58 may consider a configuration time duration used when powering on the electronic display 12 to determine the wake-up time. The configuration time duration may correspond to an amount of time used to instruct the display power supply 54 to connect power to the electronic display 12 an amount of time used to configure the electronic display 12 after returning power to the electronic display 12, or the like. In some cases, an indication of the configuration time duration and/or the latest time may be stored in memory, such as the memory 20 or storage 22, in association with an indication of a corresponding expected activity. When stored, the condition pre-processor 58 may read the indication of the configuration time duration and/or the latest time from the memory and use the information when determining a wake-up time. By writing the indication of the configuration time duration and/or the latest time into memory for repeated reference, computing resources may be conserved relative to repeating the processing operations for each indication of the expected activity.

In process block 138, the condition pre-processor 58 receives an indication of a current time. The condition pre-processor 58 may poll a counter or a system that manages time for the electronic device 10. Any suitable method of receiving a current time may be used. In process block 140, the condition pre-processor 58 determines a difference between the current time and the wake-up time. In process block 142, the condition pre-processor 58 may compare the difference to a threshold to determine whether the difference between the current time and the wake-up time is suitably large to justify powering off the electronic display 12.

In response to the difference being greater than the threshold, the condition pre-processor 58 decides to power off the electronic display 12 and thus, in process block 144, the condition pre-processor 58 may confirm the decision to power off the electronic display 12 based on sensing data from the condition sensors 66. This operation may enable the electronic device 10 to avoid powering off the electronic display 12 when sensing data or other data indicates that the electronic display 12 is being viewed by and/or is in a visible range of a viewer. When the sensing data indicates that it is not suitable to power off the electronic display 12, the condition pre-processor 58 may repeat operations at process block 132 or may wait until the sensing data indicates that it is suitable to power off the electronic display 12. When the sensing data indicates that it is suitable to power off the electronic display 12 at process blocks 142 and 144, in process block 146, the condition pre-processor 58 generates an event notification as the condition indication 62 to instruct the suppression management system 56 to power off the electronic display 12. The reception of the condition indication 62 may cause the suppression management system 56 to perform operations of method 80 of FIG. 8. It is noted that the condition indication 62 may be read from the condition pre-processor 58 by the suppression management system 56 and/or be transmitted by the condition pre-processor 58 to the suppression management system 56 once generated. In this manner, the method 130 enables the electronic device 10 to enter the suppression operational mode in response to calendar event data, alarm data, or the like indicating that the electronic device 10 is idle due to a sleep event or another scheduled event indicated via the calendar event data.

In some cases, the condition pre-processor 58 may indicate the wake-up time to the suppression management system 56 in association with the condition indication 62. The suppression management system 56 may determine when to return power to the electronic display 12 based on the wake-up time. For example, suppression management system 56 may determine to instruct the display power supply 54 at the wake-up time to ensure that there is enough time to program the electronic display 12 once it is powered on. An indication of the wake-up time may be stored and referenced by the suppression management system 56 when determining at what time to return power to the electronic display 12.

In some cases, the operations of FIG. 11 may be based on machine-learning-based systems. For example, machine learning may be used by the electronic device 10 to determine, over time, a schedule of use (e.g., predicted periods of activity and inactivity) that may be used when determining to power off the electronic display 12. As used herein, machine-learning may refer to algorithms and statistical models that computer systems (e.g., including the electronic device 10) use to perform a specific task with or without using explicit instructions. For example, a machine-learning process may generate a mathematical model based on a sample of data, known as "training data," in order to make predictions or decisions without being explicitly programmed to perform the task.

Depending on the inferences to be made, the confidence validation logic may implement different forms of machine-learning. For example, in some embodiments (e.g., when particular known examples exist that correlate to future predictions or estimates that a machine-learning engine may be tasked with generating), a machine-learning engine may implement supervised machine-learning. In supervised machine-learning, a mathematical model of a set of data contains both inputs and desired outputs. This data is referred to as "training data" and may include a set of training examples. Each training example may have one or more inputs and a desired output, also known as a supervisory signal. In a mathematical model, each training example is represented by an array or vector, sometimes called a feature vector, and the training data is represented by a matrix. Through iterative optimization of an objective function, supervised learning algorithms may learn a function that may be used to predict an output associated with new inputs. An optimal function may allow the algorithm to correctly determine the output for inputs that were not a part of the training data. An algorithm that improves the accuracy of its outputs or predictions over time is said to have learned to perform that task.

Supervised learning algorithms may include classification and regression techniques. Classification algorithms may be used when the outputs are restricted to a limited set of values, and regression algorithms may be used when the outputs have a numerical value within a range. Similarity learning is an area of supervised machine-learning closely related to regression and classification, but the goal is to learn from examples using a similarity function that measures how similar or related two objects are. Similarity learning has applications in ranking, recommendation systems, visual identity tracking, face verification, and speaker verification.

Additionally and/or alternatively, in some situations, it may be beneficial for the machine-learning engine to utilize unsupervised learning (e.g., when particular output types are not known). Unsupervised learning algorithms take a set of data that contains only inputs, and find structure in the data, like grouping or clustering of data points. The algorithms, therefore, learn from test data that has not been labeled, classified, or categorized. Instead of responding to feedback, unsupervised learning algorithms identify commonalities in the data and react based on the presence or absence of such commonalities in each new piece of data.

That is, the machine-learning engine may implement cluster analysis, which is the assignment of a set of observations into subsets (called clusters) so that observations within the same cluster are similar according to one or more predesignated criteria, while observations drawn from different clusters are dissimilar. Different clustering techniques make different assumptions on the structure of the data, often defined by some similarity metric and evaluated, for example, by internal compactness, or the similarity between members of the same cluster, and separation, the difference between clusters. In additional or alternative embodiments, the machine-learning engine may implement other machine-learning techniques, such as those based on estimated density and graph connectivity. It is noted that machine learning operations and the machine learning engine are elaborated on with respect to FIG. 14.

With this in mind, machine-learning operations may predict a use schedule of the electronic device 10 based on learned patterns of operations. For example, the local control circuitry 68, the condition pre-processor 58, the application processor 50, or other suitable processing circuitry of the processor core complex 18 may include the machine-learning engine, which identify time periods of activity, time periods of inactivity, and one or more triggers to the time periods of activity and may correlate use patterns of the electronic device 10 to sensing data, operational conditions, time, locations, or the like to better predict when the electronic device 10 is to be used or viewed, and thus to better predict when to power off or power on the electronic display 12. In some cases, the machine learning engine may receive and train on example time periods of activity and/or inactivity and/or triggers to enter a time period of activity and/or inactivity to improve analysis and identification of what combinations of sensing data are present for these situations and what suitable threshold ranges may be used to trigger powering off or powering on the electronic display 12.

As yet another example, FIG. 12 is a flowchart of a third example method 160 that may be used by the condition pre-processor 58 when generating the condition indication 62. This may be an example method for the electronic device 10 to use when determining to enter and/or exit the suppression operational mode at process block 86 and/or at process block 90 of FIG. 8. As described here, the condition pre-processor 58 of FIG. 7 performs operations of the method 160. However, it should be noted that any suitable device (e.g., a controller) that may control one or more components of the electronic device 10, such as the processor core complex 18, may perform the method 160. In some embodiments, the method 160 may be implemented by executing instructions stored in a tangible, non-transitory, computer-readable medium, such as the memory 20 or storage 22, using the processor core complex 18. For example, the method 160 may be performed at least in part by one or more software components, such as an operating system of the electronic device 10, one or more software applications of the electronic device 10, and the like. While the method 160 is described using steps in a specific sequence, it should be understood that the present disclosure contemplates that the described steps may be performed in different sequences than the sequence illustrated, and certain described steps may be skipped or not performed altogether.

In process block 162, the condition pre-processor 58 receives sensing data from the one or more condition sensors 66. For sake of concise description, these operations are similar to those of process block 122 of FIG. 10 and thus are relied on herein. The sensing data may include or correspond to a packet received via an RF sensor (e.g., an antenna and RF processing circuitry) and/or a BLUETOOTH® sensor (e.g., an antenna and RF processing circuitry). The RF sensor may include one or more UWB interfaces and/or one or more RSSI sensing interfaces. In some cases, the sensing data is processed by the condition sensor 66 to generate the packet, such as when radio frequency signals carry the packet as part of a frequency modulated or amplitude modulated signal transmission.

In process block 164, the condition pre-processor 58 determines an identity of an associated electronic device based on the sensing data. The associated electronic device may correspond to a same user profile associated with the electronic device 10, and in this way may be considered a device additionally affiliated or used by the user. The associated electronic device may be an electronic wearable device, such as a watch, glasses, or other suitable accessory electronic device, another mobile phone, another laptop, computer, or the like, or any electronic device 10. The associated electronic device may be disposed outside a visible range associated with the electronic display 12 while being disposed within a communicative range of the electronic device 10, enabling predictive detection of a viewer associated with the associated electronic device. The sensing data may include an indication of an identity of the associated electronic device, such as when a radio frequency sensor (e.g., antenna) receives a carrier signal that indicates a matching user profile identifier to the electronic device 10. For example, a user associated with a user profile may be associated with a user profile of the associated electronic device. The user profile may correspond to a user identification code or sequence (e.g., an alphanumeric sequence). To identify the associated electronic device, the condition pre-processor 58 may isolate the user identification code or sequence from the sensing data, such as by processing a radio frequency signal received via an RF sensing device (e.g., an UWB interface, an RSSI sensing interface).

In process block 166, the condition pre-processor 58 receives an expected identity associated with the electronic device 10. The expected identity may correspond to the user profile associated with the associated electronic device. In some cases, the expected identity may correspond to a database of user profiles associated with a user profile of the electronic device 10. In some cases, operations of process blocks 164-168 may be modified and the electronic display 12 be powered off when no one is nearby and powered on when any detectible person is nearby.

In process block 168, the condition pre-processor 58 determines whether the identity matches the expected identity from process block 166. This determination verifies that the associated electronic device is associated with a same user profile as the electronic device 10. When the identity is different from the expected identity, the method 160 may proceed to process block 162 to be repeated.

However, in response to the identity matching the expected identity, in process block 170, the condition pre-processor 58 generates a presence event notification as the condition indication 62. The presence event notification may indicate to the suppression management system 56 when a user is nearby or relatively proximate to the electronic device 10 based on signals emitted by the associated electronic device, which may improve suppression methods since the signals emitted may be detected before the user may be detected via audiovisual-related sensors or other sensors that rely on more proximate sensor readings. Indeed, detecting a presence of a viewer via method 160 may detect a person through walls or other solid materials. It is noted that the condition indication 62 may be read from the condition pre-processor 58 by the suppression management system 56 and/or be transmitted by the condition pre-processor 58 to the suppression management system 56 once generated. Furthermore, although method 160 is described relative to detecting a matching identity of a user profile, there may be instances where it is desired to detect a presence of any person to increase a likelihood that the electronic display 12 is perceived as an always-on display. In this manner, the method 160 enables the electronic device 10 exit or enter the suppression operational mode in anticipation of a user being proximate to the electronic device 10. For example, an electronic watch (e.g., associated electronic device) with communicative capabilities may remotely trigger an electronic display 12 on a user equipment to exit the display suppression operational mode by being communicatively proximate to the electronic display 12 before being visibly proximate to the electronic display 12. In this way, the electronic device 10 may predictively and preemptively return power to the electronic display 12 when the electronic watch, and thus a user wearing the electronic watch, is a threshold distance (e.g., threshold physical proximity) and/or able to communicate with the electronic display 12. Although described herein as looking for a match in user identity, it is noted that in some cases mere presence of the associated electronic device may be sufficient to cause the electronic device 10 to return power to the electronic display 12 without necessarily requiring a match in user identity or profile.

Keeping the foregoing in mind, the suppression operational mode may be used in conjunction with a flip-book presentation mode. While operating in an always-on display mode, some portions of the electronic device 10 may be selectively powered off while one or more pre-rendered image frames are presented without active rendering by the application processor 50. Indeed, after pre-rendering image frames, the application processor 50 and/or image processing circuitry 28 (e.g., a display pipeline) may be turned off to reduce a total amount of power consumed by the electronic device 10. Moreover, once combined with suppression operations, even more power may be conserved when the electronic display 12 is powered off while the electronic device 10 is presenting a flip-book in cases where the electronic display 12 is not visible.

Figure 13:
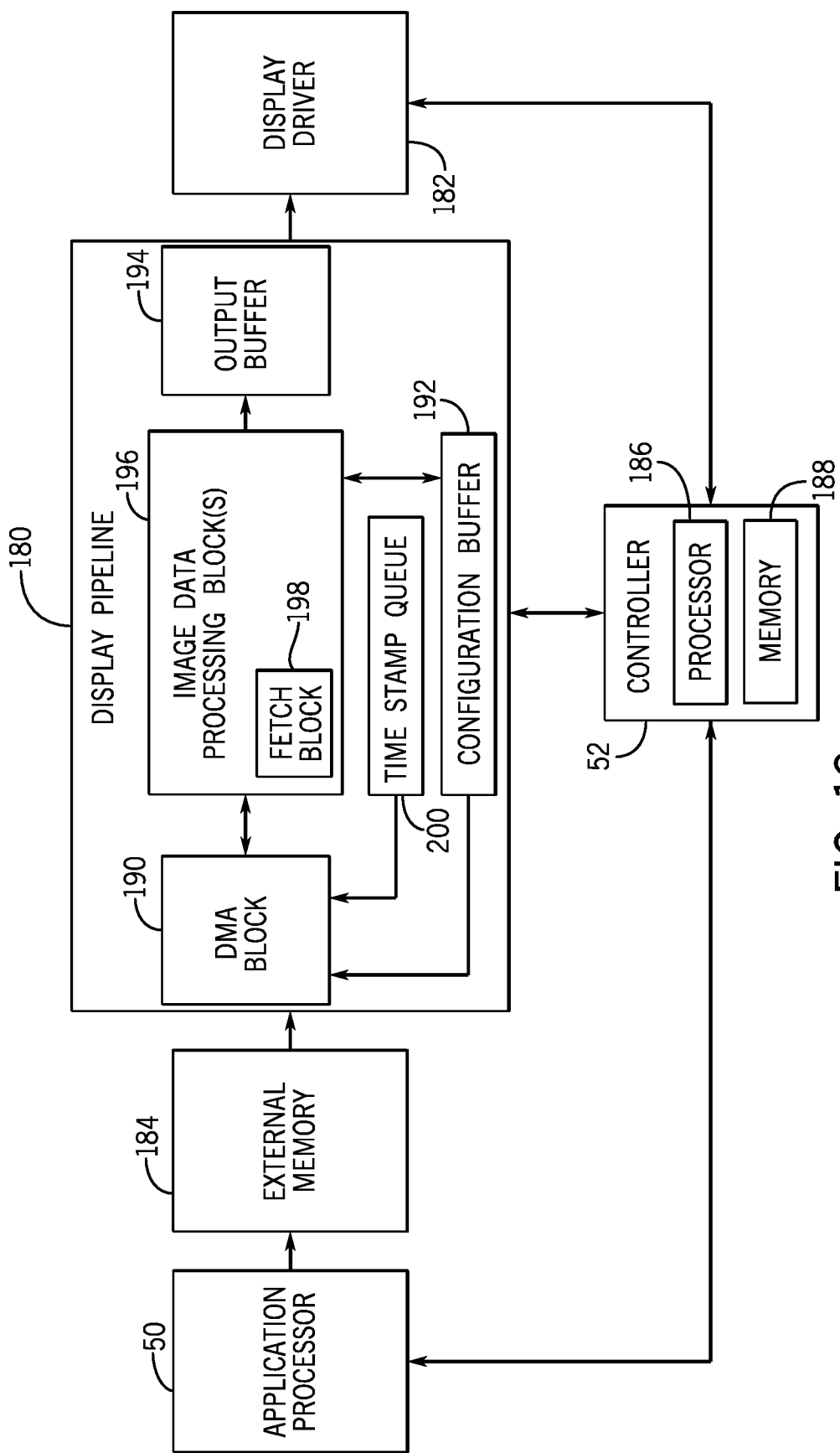
FIG. 13 is a block diagram of another example portion of the electronic device of FIG. 6, in accordance with an embodiment.

To elaborate, FIG. 13 is a block diagram of the image processing circuitry 28 that includes a display pipeline 180, which may be implemented in an electronic device 10. As depicted, the image processing circuitry 28 also includes the application processor 50, memory 20 (or storage 22), a system controller 52, and a display driver 182, which may be implemented in an electronic display 12 and used to generate control and data signals for presenting image frames via the electronic display 12. In some embodiments, the system controller 52 may control operations of the display pipeline 180, an external memory 184, the display driver 182, and/or other portions of the electronic device 10.

The system controller 52 may include a controller processor 186 and controller memory 188. The controller processor 186 may execute instructions stored in the controller memory 188. Thus, the controller processor 186 may be included in the processor core complex 18, the image processing circuitry 28, a timing controller in the electronic display 12, a separate processing module, or any combination thereof. Additionally, in some embodiments, the controller memory 188 may be included in local memory 20, the main memory storage device 22, external memory 184, internal memory of a display pipeline 180, a separate tangible, non-transitory, computer readable medium, or any combination thereof. Although depicted as a single system controller 52, in some embodiments, one or more separate controllers may be implemented to control operation of the electronic device 10.

In any case, the display pipeline 180 may operate to process image data retrieved (e.g., fetched) from the external memory 184, for example, to facilitate improving perceived image quality through the processing. The display pipeline 180 may be implemented via circuitry, for example, packaged as a system-on-chip (SoC). Additionally or alternatively, the display pipeline 180 may be included in the processor core complex 18, the image processing circuitry 28, a timing controller (TCON) in the electronic display 12, other one or more processing units, other processing circuitry, or any combination thereof.

The display pipeline 180 may include a direct memory access (DMA) block 190, a configuration buffer 192, an output buffer 194, one or more image data processing blocks 196 including a fetch block 198, and a time stamp queue 200. The display pipeline 180 may operate to retrieve image data from the external memory 184 that an application processor 50 generates and stores into the external memory 184, and upon retrieving the image data, the display pipeline 180 may also process the image data prior to transmission to the display driver 182.

As previously described, the application processor 50 operates to generate and store image data into the external memory 184 and operates to generate time stamp queue 200 entries that correspond to image data stored in the external memory 184. Each time stamp queue 200 entry may include a time stamp and a pointer. The entries of the time stamp queue 200 may each correspond to a different image frame. Each image frame may thus be associated with a respective time stamp and a respective pointer. The time stamp may indicates a target presentation time for the image frame, and the pointer may indicate where pipeline configurations corresponding to that respective image frame are stored. Pipeline configurations may be retrieved and applied to the display pipeline 180 before processing image data corresponding to a present image frame. After storing image data, pipeline configuration, and a presentation time, the application processor 50 may determine if the most recently stored image data corresponds to a last image of a flip-book. Thus, the application processor 50 performs this check to determine if a most recently rendered image frame is a last image frame to be pre-rendered. If the most recently rendered image frame is not the last image frame of the flip-book, the application processor 50 may repeat the process and continue to generate additional image frames corresponding to the flip-book.

However, when the most recently rendered image frame is a last flip-book image the application processor 50 may continue on to generate a pipeline power-on configuration. The application processor 50 may store the pipeline power-on configuration in external memory 184. The pipeline power-on configuration may correspond to configuration data used to reconfigure (e.g., re-program) the display pipeline 180 after powering-on from a power-off state. For example, the pipeline power-on configuration may indicate where to fetch image data for display after power-on, processor interfacing commands, pipeline configuration to be applied to the display pipeline 180, clock and/or timing instructions, and the like. The application processor 50 may generate code, instructions, settings, values, or any combination thereof for packaging and/or grouping as the pipeline power-on configuration. The application processor 50 may store the pipeline power-on configuration at the same or different memory location as the image data, the presentation time, the pipeline configuration, or any combination thereof.

After generating the flip-book and the power-on configuration, the application processor 50 may indicate that the flip-book operational mode is ready. The application processor 50 may indicate to the system controller 52 that the flip-book is ready. The application processor 50 may transmit an indication in the form of a bit, a flag, a signal, and the like to other components in the electronic device 10, such as the system controller 52. The system controller 52 and/or the display pipeline 180 may perform an action in response to receiving the indication. For example, the system controller 52 may power-off the application processor 50 and/or at least a portion of the display pipeline 180 to decrease power consumed by the electronic device 10.

Over time, the display pipeline 180 may be operated to retrieve the stored image data and entries in preparation for output. The display pipeline 180 may "pop" respective entries from the time stamp queue 200 for processing. Entries may be "popped" a sufficient time (e.g., a threshold amount of time such as between 1.0 microseconds (μs) and 5.0 μs) prior to the target presentation time indicated by the time stamp. After the entry is popped, the display pipeline 180 may reference the pointer, retrieve the corresponding pipeline configuration from the external memory 184, and use the retrieved pipeline configuration to prepare itself to process image data associated with the image frame. The display pipeline 180 may use the DMA block 190 to retrieve the pipeline configurations from memory 184 and may apply the pipeline configurations to itself via the configuration buffer 192.

After popping the time stamp queue 200, the display pipeline 180 may reference the time stamp to determine a next target presentation time corresponding to a next image frame. The display pipeline 180 may determine a configuration time associated with the image frame based on the target presentation time of the image frame. The configuration time is the time when the display pipeline 180 begins retrieval and loading of the pipeline configurations, and thus equals at least a processing duration and a configuration duration before the target presentation time. Thus, after popping the time stamp queue, the display pipeline 180 may determine a next configuration time for a next image frame to be displayed such that at that next configuration time, the display pipeline 180 pops the corresponding entry and retrieves the pipeline configuration from the external memory 184. After applying corresponding pipeline configurations for processing of a next image frame, the display pipeline 180 may process and complete preparations associated with displaying the image frame prior to the time stamp. The display pipeline 180 may use an image data processing block 196 to prepare the image data for transmission to the display driver 182. Upon completion of processing, the display pipeline 180 may transmit the image data to the display driver 182 to enable display of the corresponding image frame on the electronic display 12. Based at least in part on image data transmitted by the display pipeline 180, the display driver 182 may generate and supply analog and/or digital electrical signals to display pixels of the electronic display 12 to display an image frame. The display driver 182 may refresh the electronic display 12 according to various, predetermined refresh frequencies (e.g., 240 Hz, 120 Hz, 60 Hz, 50 Hz, 40 Hz, 30 Hz, 20 Hz, 10 Hz) to reduce an appearance of visual artifacts on the electronic display 12.

Image data retrieved from the external memory 184 may be processed in the image data processing block 196. Although shown as one block in FIG. 6, it should be understood that the image data processing block 196 may include multiple processing components that include any suitable combination of hardware-based and/or software-based processing functions. Indeed, when the image data processing block 196 includes two or more blocks, each processing operational block may output processed data to another processing block or to the output buffer 194. This may allow image data (e.g., image data from the DMA block 190) to be processed sequentially. Sequential processing of the image data by respective processing operations or block of the image data processing block 196 may involve transmission of individual data bits, portions of data, portions of an image frame (e.g., subsets of image data defining an image frame), an entire image frame, an entire partial image frame, or the like to another processing operation or block of the image data processing block 196. In this way, any suitable amount of data may be passed from one block to another block to process the image data via the image data processing block 196. Some blocks of the image data processing block 196 may process data in parallel. For example, some blocks may involve a graphics processing unit capable of processing subsets of input data in parallel. It is also noted that parallel processing may occur between data being processed by the block as opposed to data being processing outside of the block. To explain differently with an example, data A being processed by block A may be processed in parallel by the block A, and data B being processed by block B may be processed in parallel with operations of the block A processing data A; however, sometimes data A may not be processed by the block A and by the block B in parallel. This may occur since the block A is to pass on the data A to the block B for further processing. It is noted that, in this example, data A and data B may be different subsets of image data for a same image frame; however, other combinations may also apply.

The image data processing block 196 may process the image data to improve a perceived image quality of the image frame resulting from the image data. For example, the image data processing blocks 196 may include a color management block that converts image data from a source space to a display space of the electronic display 12. The image data processing blocks 196 may include a pixel contrast control block that applies tone maps to the image data to control a perceived contrast or a perceived white point based at least in part on environmental conditions, such as ambient light. The image data processing blocks 196 may also include a fetch block 70 that uses the DMA block 190 to retrieve image data for processing.

Figure 14:
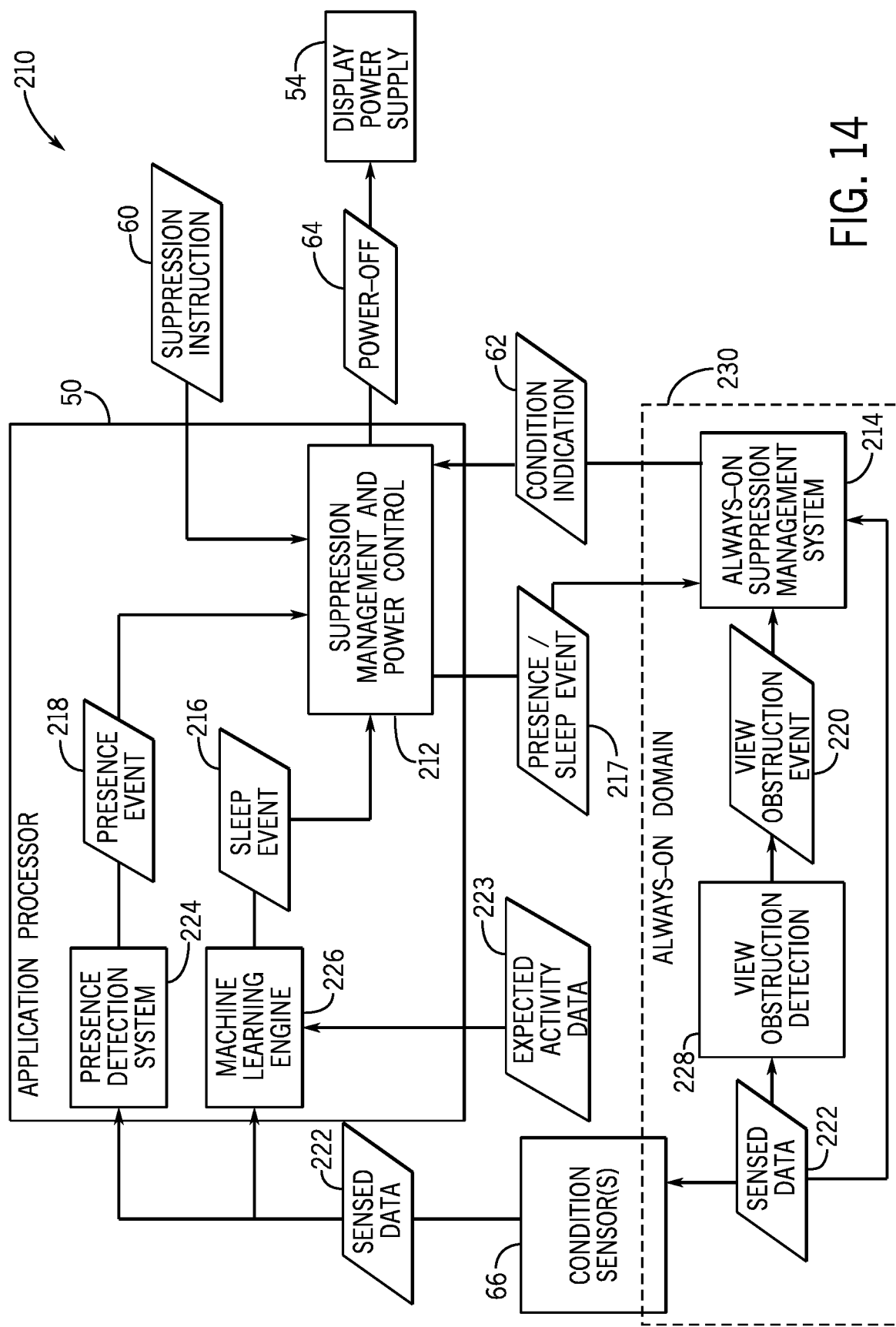
FIG. 14 is a block diagram of a suppression management architecture that may combine systems of FIG. 7, flip-book operations described relative to FIG. 13, always-on display operations, condition indication examples described in FIGS. 10-12, or any combination thereof, in accordance with an embodiment.

Keeping the foregoing in mind, the image processing circuitry 28 may be involved in the suppression operations described above and generally combined with the suppression management system 56 and/or the condition pre-processor 58 of FIG. 7. To elaborate, FIG. 14 is a block diagram that shows a suppression management architecture 210 that combines systems of FIG. 7, flip-book operations of FIG. 13, always-on display operations described earlier, the condition indication 62 examples described in FIGS. 10-12, or any combination thereof. The flip-book mode may sometimes us opportunistic generation techniques that compares a current time to presentation times of the image frames of the flip-book to determine whether returning to an active, normal operational mode or whether returning to a flip-book mode consume less power. The suppression management system 56 of FIG. 7 may correspond to a suppression management and power control system 212 of FIG. 14 and/or an always-on suppression management system 214 of FIG. 14. At a high-level, the suppression management and power control system 212 may control power supplied to the electronic display 12 via the display power supply 54 based on a suppression instruction 60, a sleep event indication 216, a presence event indication 218, and/or the condition indication 62.

The suppression instruction 60 may correspond to an input received via one or more of the input devices 14 and/or via tactile input to the electronic display 12. The suppression instruction 60 may indicate to the suppression management and power control system 212 to suppress image frame presentation from the electronic display 12 immediately, to suppress image frame presentation from the electronic display 12 when conditions are suitable, or the like. Indeed, in response to receiving a suppression instruction 60 from another portion of the electronic device 10 (e.g., input device 14), the suppression management and power control system 212 may generate and send the power-off control signal 64 to the display power supply 54. In some cases, the suppression management and power control system 212 may delay sending the power-off control signal 64 to the display power supply 54 until another condition (e.g., presence event, sleep event, reception of the condition indication 62) occurs.

When the suppression instruction 60 indicate to the suppression management and power control system 212 to suppress image frame presentation from the electronic display 12 when conditions are suitable, the suppression management and power control system 212 may transmit a presence/sleep event indication 217 to the always-on suppression management system 214. The always-on suppression management system 214 may receive the presence/sleep event indication 217 and may verify suitable conditions to turn off the electronic display 12 based on the sensed data 222, similar to verification operations based on sensing data of FIGS. 10-12). Once the always-on suppression management system 214 verified that it is permitted to suppress image presentation, the always-on suppression management system 214 generates and sends the condition indication 62 to the suppression management and power control system 212.

A presence detection system 224 may perform operations of FIG. 12, a machine learning engine 226 may perform operations corresponding to FIG. 11, and/or a view obstruction detection system 228 may perform operations of FIG. 10. Any of these systems may use sensed data 222 from the condition sensors 66. It is noted that the condition sensors 66 may be partially disposed in an always-on domain 230 and partially disposed outside the always-on domain 230. In this way, some condition sensors 66 may remain always on even during power gating operations and some may not. The condition sensors 66 that remain on may be operated into reduced power consumption modes, such as using a slower sensing frequency. The always-on domain 230 may also include the always-on suppression management system 214.

The machine learning engine 226 may generate the sleep event indication 216 based on expected activity data 223, which may include any suitable data indicative of an expected viewing pattern, such as calendar data, alarm data, behavioral patterns of a user or other viewers of the electronic device 10, a motion profile, or the like. The machine learning engine 226 may include a machine learning classifier configurable to predict an upcoming duration of time of non-use of the electronic display 12. The prediction may be based on usage patterns that the machine learning engine 226 was trained on. The motion profile may indicate an expected set of sensing data that corresponds to a pattern of motion associated with how a viewer or user interacts with or views the electronic device 10. The pattern of motion may not be limited to how the electronic device 10 is moved. Indeed, the pattern of motion may include audible sound detection, pressure difference detection, ultrasonic motion detection and/or monitoring, and the like to estimate a profile of what motions corresponds to what interactions with the electronic device 10, which may be correlated to a likelihood or a time duration of visibility. Controlling a brightness (or another visual characteristic) or power of the electronic display 12 based on the motion profiles may improve power control operations by enabling the power control operations to be customized for motion profiles corresponding to that electronic device 10. In some systems, the motion profiles may be used in one or more electronic devices 10. The presence detection system 224 and/or the machine learning engine 226 may be frameworks implemented by the application processor 50. The view obstruction detection system 228 may generate a view obstruction event indication 220 that indicates when the electronic display 12 is concealed from being able or otherwise is unable to be viewed.

In one example, the view obstruction detection system 228 may be operated in an always-on domain 230 to generate the view obstruction event indication 220. The always-on suppression management system 214 may be a relatively less complex processing system that controls when to wake up the application processor 50 once it is powered off to resume image generation operations. Some suppression operations may occur when the application processor 50 is operated off (e.g., flip-book mode), such as may occur in the power state 40B to stop a generation of image frames and/or to stop an advancement through a flip-book. When the electronic device 10 operates in the flip-book operational mode, the application processor 50 may be powered off after generating a flip-book.

When the electronic device 10 operates in both the suppression operational mode and the flip-book operational mode, at the end of a flip-book, if the electronic display 12 is suppressed, the always-on suppression management system 214 may delay waking up and returning power to the application processor 50 until the electronic display 12 is to be powered on again (at exit from the suppression operational mode) as opposed to returning power to the application processor 50 to prepare another flip-book. Furthermore, while in both the suppression operational mode and the flip-book operational mode, if the electronic display 12 is suppressed, the always-on suppression management system 214 may consider a configuration time used to wake up and reprogram the display pipeline 180 for a subsequent processing operation, as well as a configuration time used to initialize and program the electronic display 12 when power is returned to the display, when determining at what time to return power to the application processor 50. Although the always-on domain 230 includes the always-on suppression management system 214, in some cases, the application processor 50 may include the always-on suppression management system 214.

In some cases, the condition sensors 66 include a proximity sensor that operates at least partially using circuitry disposed in the electronic display 12. Due to this, consideration may be made to timing of sensing and display operations. Indeed, a buffer may be extended and/or included in the electronic display 12 to enable suppression of the display operations without interrupting the proximity sensing operations.

Figure 15:
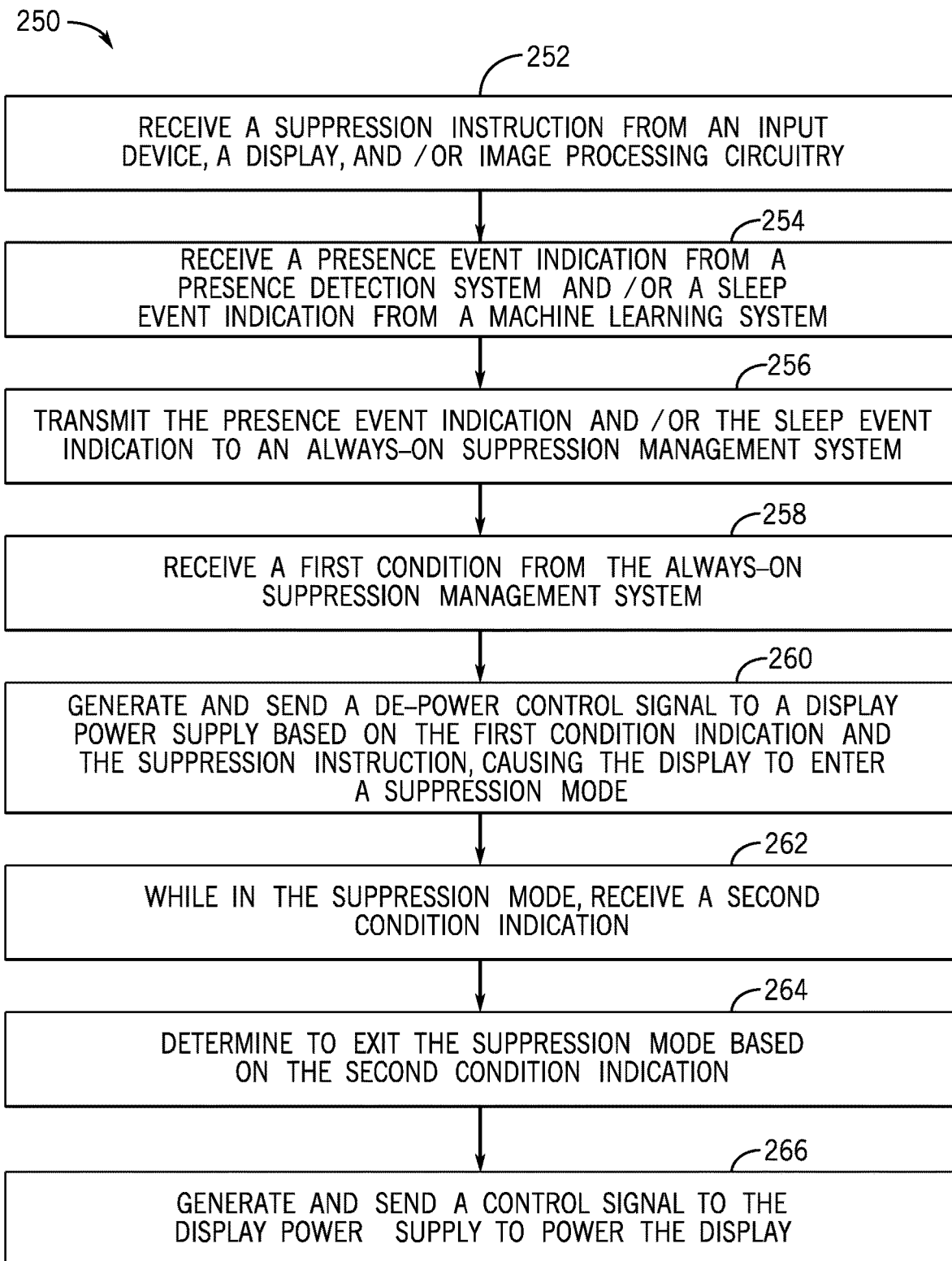
FIG. 15 is a flowchart of a method that may be used by the electronic device of FIG. 1 when determining to enter and/or exit the suppression operational mode based on a suppression instruction and/or a condition indication, in accordance with an embodiment.

Elaborating further on the systems and methods of FIG. 14, FIG. 15 is a flowchart of a method 250 for the electronic device 10 to use when determining to enter and/or exit the suppression operational mode based on the suppression instruction 60 and the condition indication 62. As described here, the suppression management and power control system 212 of FIG. 14 performs operations of the method 250. However, it should be noted that any suitable device (e.g., a controller) that may control one or more components of the electronic device 10, such as the processor core complex 18, may perform the method 250. In some embodiments, the method 250 may be implemented by executing instructions stored in a tangible, non-transitory, computer-readable medium, such as the memory 20 or storage 22, using the processor core complex 18. For example, the method 250 may be performed at least in part by one or more software components, such as an operating system of the electronic device 10, one or more software applications of the electronic device 10, and the like. While the method 250 is described using steps in a specific sequence, it should be understood that the present disclosure contemplates that the described steps may be performed in different sequences than the sequence illustrated, and certain described steps may be skipped or not performed altogether. It is noted that many of these operations were described above with respect to FIG. 14, and thus descriptions are relied on herein.

In process block 252, the suppression management and power control system 212 receives the suppression instruction 60 from an input device 14, a tactile input to the electronic display 12, image processing circuitry 28, or the like. In process block 254, the suppression management and power control system 212 receives a presence event indication 218 from the presence detection system 224 and/or a sleep event indication 216 from the machine learning engine 226. The presence event indication 218 may indicate that the electronic display 12 is not visible to a viewer at that time due to the viewer being physically away or at a distance from the electronic device 10 (e.g., a past viewer of the electronic display 12 is no longer viewing the electronic display 12). The presence event indication 218 may use step count data to determine whether a viewer is nearby (within a threshold distance) of the electronic device 10. The sleep event indication 216 may indicate that the electronic display 12 is not visible to a viewer at that time due to the viewer being asleep. As noted above, the sleep event indication 216 may be generalized as an event indication, where the event indicated may be a user being asleep or in a meeting and/or otherwise at an event not viewing the electronic display 12.

In process block 256, the suppression management and power control system 212 transmits the presence event indication 218 and/or the sleep event indication 216 to the always-on suppression management system 214. Here, the always-on suppression management system 214 receives the presence event indication 218 and/or the sleep event indication 216 and verifies that conditions are suitable to enter the suppression operational mode. The always-on suppression management system 214 may verify based at least in part on the sensed data 222. For example, the always-on suppression management system 214 may verify that the electronic device 10 is indeed not moving when calendar data used to generate the sleep event indication 216 corresponds to an event. Once validated, the always-on suppression management system 214 may generate and send a first condition indication 62 to the suppression management and power control system 212.

In process block 258, the suppression management and power control system 212 may receive the first condition indication 62 and, in response to the first condition indication 62, in process block 260, the suppression management and power control system 212 generates and sends a de-power control signal (e.g., power off instruction) to the display power supply 54. Once the electronic display 12 is de-powered, the electronic device 10 may be in a suppression operational mode (e.g., similar to operations of FIG. 8).

While in the suppression operational mode, in process block 262, the suppression management and power control system 212 receives a second condition indication 62. The second condition indication 62 may correspond to a wake-up condition being met. Examples of the wake-up condition being met include the always-on suppression management system 214 determining that the electronic device 10 is to exit the suppression operational mode, such as in response to a predicted wake-up time, an response to an incoming viewer, or the like. Based the second condition indication 62, in process block 264, the suppression management and power control system 212 determines to operate the electronic device 10 to exit the suppression operational mode by powering on the electronic display 12. To do so, in process block 266, the suppression management and power control system 212 generates and sends a power control signal to the power supply 54 to return power to the electronic display 12. In this manner, the method 250 enables the electronic device 10 exit or enter the suppression operational mode based on different sub-systems generating different condition indications 62. Additionally, the method 250 enables the electronic device 10 enter the suppression operational mode after receiving a suppression instruction 60 from a first portion of the electronic device 10 and validating the suppression instruction 60 via a second portion of the electronic device 10.

Figure 16:
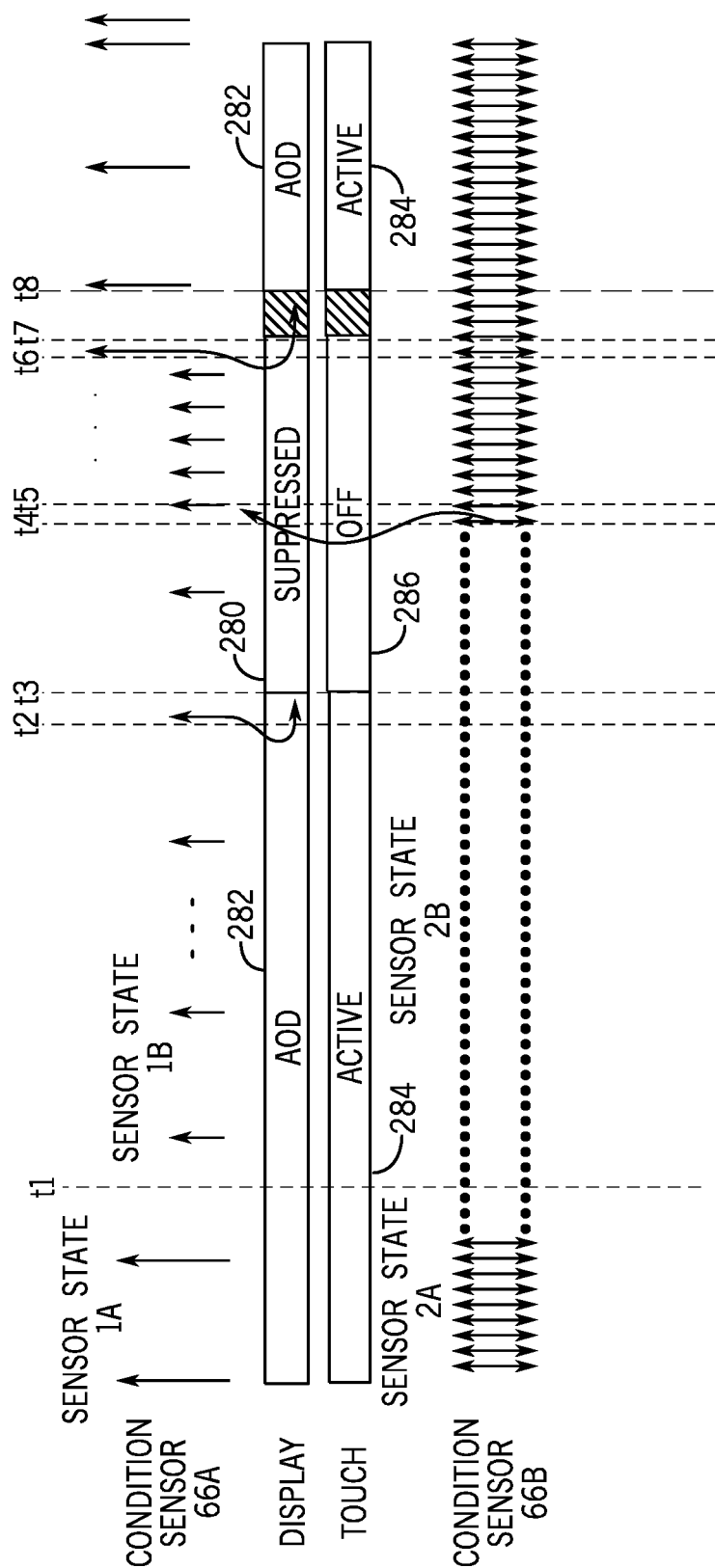
FIG. 16 is a diagrammatic representation of how two or more condition sensors may interact when the electronic device of FIG. 1 is determining to enter the suppressed operational mode, in accordance with an embodiment.

Another example operation is shown in FIG. 16. FIG. 16 is a diagrammatic representation of how two or more condition sensors 66 may interact when the electronic device 10 is determining to enter the suppressed operational mode 280. FIG. 16 generally shows how a threshold duration of time (e.g., a minimum amount of time) may be used to slow an entering into the suppressed operational mode 280 but how the same duration parameter may be ignored at exit from the suppressed operational mode 280. Using the threshold duration of time for entering but not exiting the suppression operational mode may have the added benefit of causing the electronic device 10 to not prematurely enter the suppression operational mode but, while in the suppression operational mode, be responsive to changes in ambient and/or operating conditions. Before a first time (t1), condition sensor 66A and condition sensor 66B may sense ambient conditions while in an always-on display (AOD) operational mode 282 of a display sub-system and an active mode 284 of a touch sub-system. Around t1, the condition sensor 66A may generate sensing data that the condition pre-processor 58 determines corresponds to a condition being met to enter the suppressed operational mode 280. The transition from the AOD operational mode 282 to the suppressed operational mode 280 may be delayed until a duration of time passes and the condition is still indicated as being met as new sensing data is generated by the condition sensor 66A and processed by the condition pre-processor 58. At a second time (t2), the condition sensor 66A and/or condition sensor 66 may generate sensing data that the condition pre-processor 58 uses to confirm that a condition is still met to enter the suppressed operational mode. For example, at t1, condition sensor 66A may detect the electronic device 10 to be a threshold distance from a viewer and by t2, the condition sensor 66B may detect the electronic device 10 is stationery, thereby confirming that a viewer is no longer viewing or using the electronic device 10, enabling the electronic device 10 to enter the suppressed operational mode. By a third time (t3), the electronic device 10 is operated into the suppressed operational mode 280 and touch operations are operated off via disabled touch mode 286.

While in the suppressed operational mode 280 (between t3 and a seventh time (t7)), the condition sensor 66B may generate sensing data that the condition pre-processor 58 uses to confirm that a condition used to enter the suppressed operational mode 280 is now changing, such as at a fourth time (t4). In response to this sensing data and subsequent determination, the electronic device 10 is operated to increase a sensing frequency of the condition sensor 66A. Increasing the sensing frequency may increase a likelihood that the transition from the suppressed operational mode 280 is substantially simultaneous to the change in condition sensed, thereby improving operations of the electronic device 10 by reducing a delay associated with exit from the suppressed operational mode 280. By a fifth time (t5), the electronic device 10 has implemented the increased sensing frequency. It is noted that sometimes the electronic device 10 may increase or adjust the sensing frequency based on which other sensor indicated the changing conditions. For example, a proximity sensor detecting a changed condition may yield a faster refresh rate than a temperature sensor detecting a changed condition.

By a sixth time (t6), the condition sensor 66A may have detected the changing condition that the condition sensor 66B had detected. In response to the condition sensor 66A detecting the changing condition, the electronic device 10 may exit the suppressed operational mode 280. By t7, the electronic device 10 may begin transition into the AOD operational mode 282 once again. By an eighth time (t8), the electronic device 10 may enter the AOD operational mode 282. With the transition into the AOD operational mode 282, sensing frequency may decrease again to an original rate from before entering into the suppressed operational mode 280. These systems and methods may tradeoff being increasing and reducing power consumed via the condition sensors 66 by changing the sensing frequency in response to conditions being met that increase or decrease a likelihood or relative importance of detecting changes in value.

Here, the electronic device 10 may have been operating already in an always-on display (AOD) operational mode as the AOD operational mode 282, thus the mode entered into is an AOD suppressed operational mode 280. The AOD suppressed operational mode may correspond to the second power state 40B, or a second lowest power state. In AOD suppressed operational mode, advancement through image frames of a flip-book may be paused or stopped and touch disabled (e.g., mode 286). Once the flip-book is paused or stopped in the suppressed operational mode, the electronic device 10 may exit the suppressed operational mode and enter AOD operational mode 282. Exiting from the suppressed operational mode when the flip-book is stopped may result in the electronic device 10 transitioning from the power state 40B to the power state 40E. Exiting from the suppressed operational mode when the flip-book is paused may result in the electronic device 10 transitioning from the power state 40B to the power state 40D since the electronic device 10 is returning to present the next image frame queued of the flip-book. Here, since the electronic device 10 exits from the suppressed operational mode to an AOD operational mode, the flip-book was paused while in the suppressed operational mode. At exit from the suppressed operational mode, the electronic device 10 may "pop" the time stamp queue 200 to reveal and process a subsequent image frame or else the electronic device 10 may repeat presentation of a previous frame.

Figure 17:
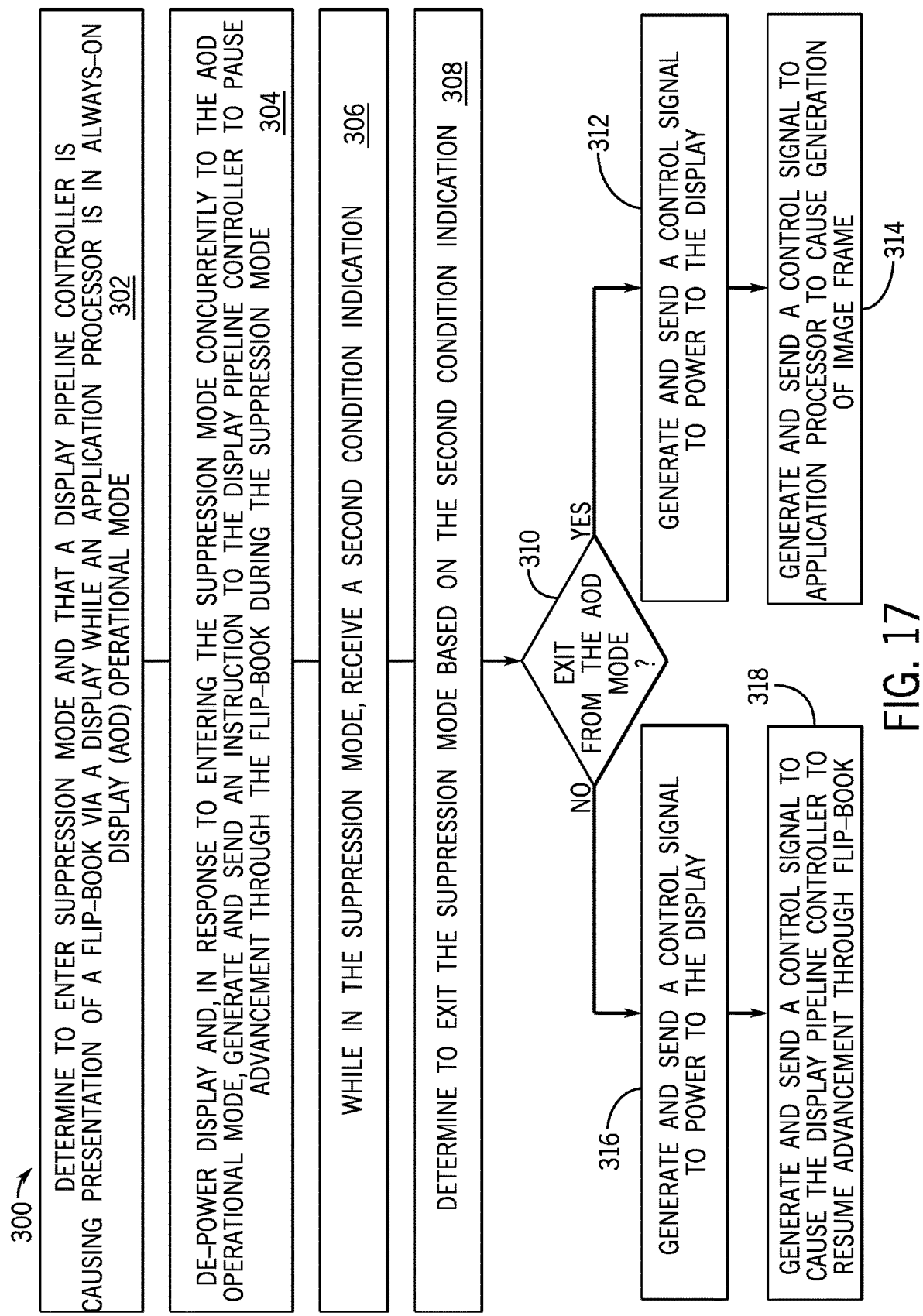
FIG. 17 is a flowchart of a method that may be used by the electronic device of FIG. 1 when determining to enter and/or exit the suppression operational mode based on the suppression instruction and/or the condition indication, in accordance with an embodiment.

Operations associated with entering and exiting an AOD operational mode may be described with regards to FIG. 17. FIG. 17 is a flowchart of a method 300 for the electronic device 10 to use when determining to enter and/or exit the suppression operational mode based on the suppression instruction 60 and the condition indication 62. As described here, the suppression management and power control system 212 of FIG. 15 performs operations of the method 300. However, it should be noted that any suitable device (e.g., a controller) that may control one or more components of the electronic device 10, such as the processor core complex 18, may perform the method 300. In some embodiments, the method 300 may be implemented by executing instructions stored in a tangible, non-transitory, computer-readable medium, such as the memory 20 or storage 22, using the processor core complex 18. For example, the method 300 may be performed at least in part by one or more software components, such as an operating system of the electronic device 10, one or more software applications of the electronic device 10, and the like. While the method 300 is described using steps in a specific sequence, it should be understood that the present disclosure contemplates that the described steps may be performed in different sequences than the sequence illustrated, and certain described steps may be skipped or not performed altogether. It is noted that many of these operations were described above with respect to FIG. 17, and thus descriptions are relied on herein.

In process block 302, the suppression management and power control system 212 determines to enter the suppression operational mode and that a display pipeline system controller 52 is causing presentation of a flip-book via the electronic display 12 while the application processor is in an always-on display (AOD) operational mode. In process block 304, the suppression management and power control system 212 generates a control signal to de-power the electronic display 12 and, in response to entering the suppression operational mode concurrently to the AOD operational mode, in process block 304, the suppression management and power control system 212 generates and sends an instruction to the system controller 52 to pause advancement through the flip-book during the suppression operational mode. In process block 306, while in the suppression operational mode, the suppression management and power control system 212 receives a second condition indication 62. In process block 308, the suppression management and power control system 212 may determine to exit the suppression operational mode based on the second condition indication 62. For example, the second condition indication 62 may communicate to suppression management and power control system 212 that a viewer is predicted to view the electronic display 12 at a predicted future time less than a threshold from a current time.

In process block 310, the suppression management and power control system 212 may determine whether to exit from the AOD operational mode. The suppression management and power control system 212 may exit the AOD operational mode as opposed to return to presenting the flip-book when an amount of power being saved by returning to and operating in the AOD operational mode exceeds an amount of power expected to be used by returning to and operating in the normal operational mode. Sometimes power savings may correspond to a number of queued frames remaining in the time stamp queue 200. For example, if a number of queued frames in the time stamp queue 200 is below a threshold, the suppression management and power control system 212 may enter an active presentation mode (e.g., power state 40E) at exit from the suppression mode. In process block 312, the suppression management and power control system 212 determines to exit the AOD operational mode and generate and send a control signal to the electronic display power supply 54 to power the electronic display 12. The electronic device 10 thus may return to a full power operational mode and, in process block 314, the suppression management and power control system 212 may generate and send a control signal to the application processor 50 to cause generation of a next image frame. This operation may also involve discarding a remaining portion of a flip-book stored in the time stamp queue 200, such as to enable the application processor 50 to resume active image frame rendering operations.

However, in response to determining to not exit the AOD operational mode at process block 310 when a threshold number of queued frames remain in the time stamp queue 200, in process block 316, the suppression management and power control system 212 may generate and send a control signal to power the electronic display 12. In processor block 318, the suppression management and power control system 212 generates and sends a control signal to cause the display pipeline system controller 52 to resume advancement through the flip-book.

In some systems, the exit from the suppression mode at block 264 of method 250 and/or at block 308 of method 300 is a soft exit, or a partial exit from the suppression mode. With a soft exit, it may be more efficient (e.g., consume fewer resources, consume reduced amounts of power) to return the electronic device to the suppression mode relative to returning to the suppression mode from a fully on operation.

Figure 18:
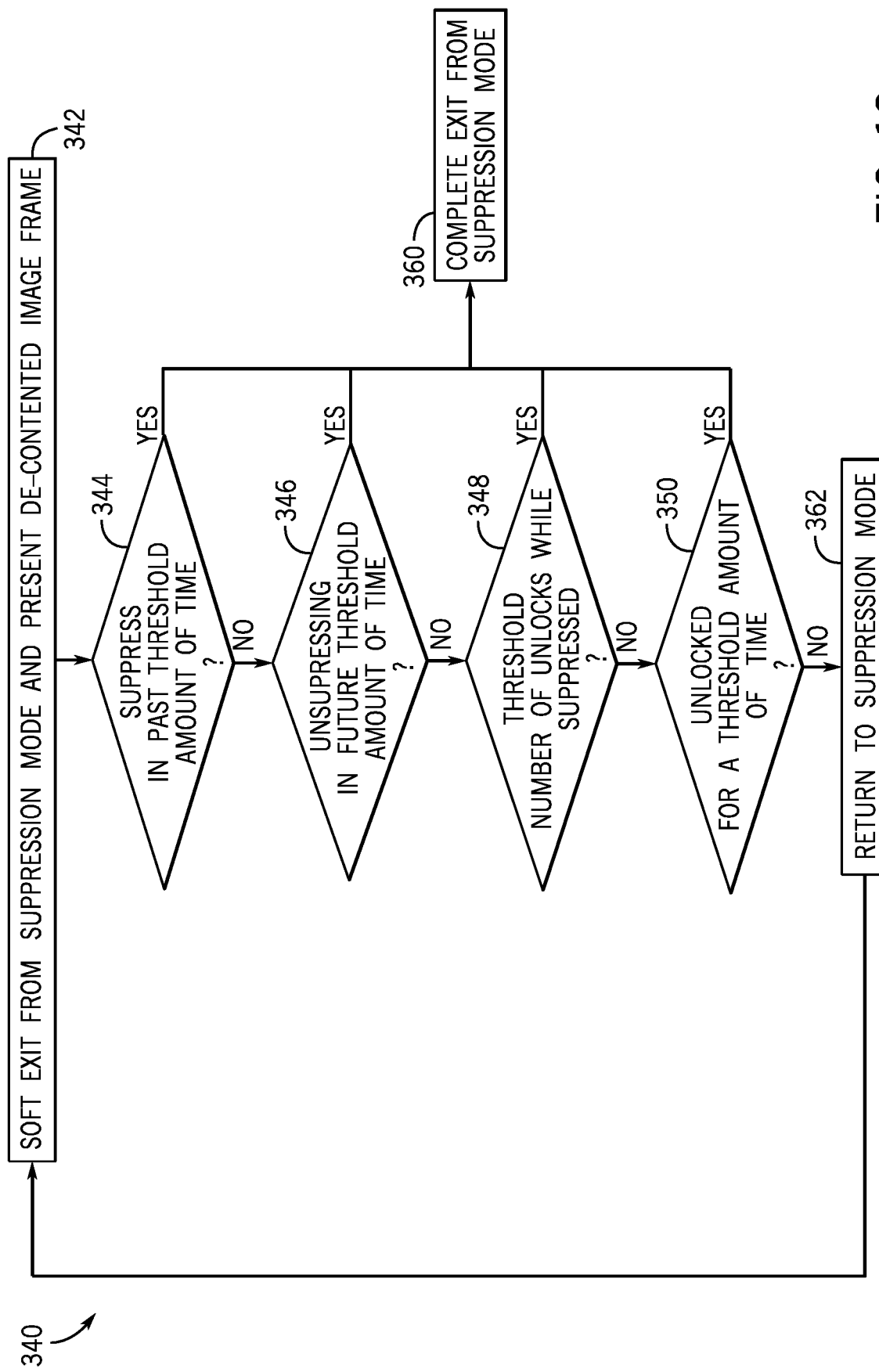
FIG. 18 is a flowchart of a method that may be used by the electronic device of FIG. 1 when determining to re-enter the suppression mode from an intermediate suppression mode (e.g., soft exit), in accordance with an embodiment.

With this in mind, FIG. 18 is a flowchart of a method 340 for the electronic device 10 to use when determining to enter and/or exit the suppression operational mode based on the suppression instruction 60 and the condition indication 62. As described here, the suppression management and power control system 212 of FIG. 15 performs operations of the method 340. However, it should be noted that any suitable device (e.g., a controller) that may control one or more components of the electronic device 10, such as the processor core complex 18, may perform the method 340. In some embodiments, the method 340 may be implemented by executing instructions stored in a tangible, non-transitory, computer-readable medium, such as the memory 20 or storage 22, using the processor core complex 18. For example, the method 340 may be performed at least in part by one or more software components, such as an operating system of the electronic device 10, one or more software applications of the electronic device 10, and the like. While the method 340 is described using steps in a specific sequence, it should be understood that the present disclosure contemplates that the described steps may be performed in different sequences than the sequence illustrated, and certain described steps may be skipped or not performed altogether. It is noted that many of these operations were described above with respect to FIG. 17, and thus descriptions are relied on herein.

While in the suppression mode described above (e.g., the suppression mode of blocks 86-90, 102-104, 114, 260, 262, 304-308), the electronic device 10 and/or the electronic display 12 may be moved, may sense an input, may receive an input, or the like, that triggers a partial exit (e.g., a soft exit) from the suppression mode and presentation of a de-contented image frame to create an illusion that the electronic display 12 had been presenting image data the whole time while in suppression mode.

Indeed, in process block 342, the suppression management and power control system 212 may determine to soft exit from the suppression mode and present a de-contented image frame. The soft exit may be paired with sleep suppression operations. In this way, the suppression management and power control system 212 may partially exit the suppression mode into a higher power state 40 that uses less power than the fifth power state 40E. By not fully powering on, the electronic device 10 may consume reduced computing resources and/or power when entering back into the suppression mode when compared to an amount of computing resources and/or power consumed when entering the suppression mode from a fully on power state 40E. While in the soft exit, the At each of the process blocks 344, 346, 348, and 350, the suppression management and power control system 212 may check a condition and, when met, may fully power on the electronic device 10 and electronic display 12 and exit, at process block 360, from the soft exit from the suppression mode. Here, four example conditions are described. However, it should be understood that other conditions may be used, including a detection of ambient light, temperature detection, other sensor conditions or the like.

To elaborate, in process block 344, the suppression management and power control system 212 may determine whether the electronic device 10 had been suppressed in the past within a threshold amount of time. For example, the suppression management and power control system 212 may determine whether the electronic device had entered the suppressed mode in the past hour. If the suppression management and power control system 212 determines that the electronic device 10 was suppressed within the threshold amount of time, the suppression management and power control system 212 may, at process block 360, completely exit from the suppression mode.

When the suppression management and power control system 212 determines that the electronic device 10 had not been suppressed within the past threshold amount of time, in process block 346, the suppression management and power control system 212 may determine whether the electronic device 10 is expected to unsuppressed within a future amount of time. To determine this, the suppression management and power control system 212 may refer to calendar entries or other stored user data to identify when an associated user account is scheduled or predicted to access the electronic device 10. If the suppression management and power control system 212 determines that the electronic device 10 is expected to be unsuppressed within the future threshold amount of time, the suppression management and power control system 212 may, at process block 360, completely exit from the suppression mode.

When the suppression management and power control system 212 determines that the electronic device 10 is not expected to exit the suppression mode within a future threshold amount of time, in process block 348, the suppression management and power control system 212 may determine whether the electronic device 10 was unlocked a threshold number of times while suppressed before soft exiting the suppression mode at process block 342. For example, the suppression management and power control system 212 may determine whether the electronic device 10 was unlocked more than two times while suppressed. Repeated unlocking may be associated with a user waking up from being asleep or otherwise returning to being active on the electronic device 10, and thus the electronic device 10 is to resume presenting images on the electronic display 12. If the suppression management and power control system 212 determines that the electronic device 10 was unlocked a threshold number of times while suppressed, the suppression management and power control system 212 may, at process block 360, completely exit from the suppression mode.

When the suppression management and power control system 212 determines that the electronic device 10 was not unlocked a threshold number of times while suppressed before soft exiting the suppression mode at process block 342, in process block 350, the suppression management and power control system 212 may determine whether the electronic device 10 was unlocked for a threshold amount of time. For example, the suppression management and power control system 212 may determine whether the electronic device 10 was unlocked for longer than a threshold amount of time. The electronic device 10 being unlocked and in use for longer than a threshold amount of time, for example a few seconds (e.g., 10-20 seconds), may indicate a return of user activity of the electronic device 10, and thus that the electronic device 10 is to resume presenting images on the electronic display 12. It is noted that when the electronic device 10 receives an input, such as from a user, while in the suppression mode, the suppression management and power control system 212 may cause the electronic device 10 to soft exit the suppression mode. Thus, being unlocked while suppressed or while in the suppression mode may sometimes refer to being in the soft exit from the suppression mode. If the suppression management and power control system 212 determines that the electronic device 10 was unlocked for a threshold amount of time while suppressed, the suppression management and power control system 212 may, at process block 360, completely exit from the suppression mode.

However, when the suppression management and power control system 212 determines that the electronic device 10 was not unlocked for a threshold amount of time while suppressed, in process block 362, the suppression management and power control system 212 may operate the electronic device 10 to return to the suppression mode from the soft exit. To return to the suppression mode, the suppression management and power control system 212 may perform operations similar to those described as block 88 of FIG. 8 or other associated de-powering operations described herein. Along with the return to the suppression mode, the suppression management and power control system 212 may update a maintained count corresponding to a number of times that the electronic device 10 has been operated into the suppression mode.

In some embodiments, combinations of lesser thresholds and more conditions may be used to trigger a full exit from the suppression mode at process block 360. For example, a relatively lower threshold amount at process block 344 may be used in combination with a lower future threshold amount of time at process block 346 to help stack conditions to trigger powering of the electronic display 12. Any suitable combination of conditions may be used.

In some systems, historical logs may be used to determine and predict which sensed data is expected data based on a history of user behaviors and past patterns identified. The historical logs may be stored in memory and/or implements using buffer circuitry to temporarily store past sensed data. Historical logs may be used for a variety of condition identifications. For example, it may be undesired for the electronic display 12 to be suppressed in response to a relatively short lived shadow. The historical log may help identify whether a change in ambient light is attributable to a shadow or a true obstruction.

Furthermore, in addition to the conditions described at process blocks 344, 346, 348, and 350, lighting based trigger thresholds may be used. For example, the electronic display 12 may be suppressed in response to a light being turned off and un-suppressed in response to a light being turned on. Other qualifying conditions may include a user setting an alarm and then motion stopping being detecting, determining to suppress or un-suppressed based on a model of interaction determined based on past interactions or sensed data, the electronic display 12 receiving an input or being moved at all (e.g., sensitive motion detection v. pattern based motion detection), or the like.

Keeping the foregoing in mind, technical effects of the present disclosure include systems and methods that improve electronic device operation by selectively powering off an electronic display as part of a suppression operational mode to conserve power consumed by the electronic device. Processing circuitry described herein may determine to suppress an electronic display and/or other systems of the electronic device based on receiving an indication to enter a low power mode, an indication that an associated electronic display is no longer a threshold distance from a sensor, an indication that the electronic display is obstructed, an indication of inactivity, or any combination thereof. The electronic display may be powered off in response to operating conditions, in response to additional data (e.g., a calendar entry, alarm data), and/or in response to predicting that the electronic display will not be viewed. These operations may be further based on machine learning operations that help to correlate one or more operations with entering of the suppression operational mode to enable dynamic, real-time behavior learning on a user associated with the electronic device. Furthermore, the electronic device may determine that the electronic display will not be viewed and/or used, and thus be suitable to enter the suppression operational mode, based at least in part on sensed data from condition sensors and/or signals generated via input devices indicating a parameter, like an instruction to enter the suppressed operational mode. These systems and methods may additionally improve device operation based on the predictive screen powering off—by selectively enabling the electronic display from a power-off state to a power-on state based on a prediction of when a viewer is expected the view the display and/or use the electronic device, the systems and methods may enable a perceivably always-on display without the electronic display being operated to be always-on, thereby balancing consumer demands and interests with technical requirements of a relatively long battery life and corresponding low power consumption.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A system, comprising:
   an electronic display configured to be powered off as part of a suppression operation;
   a condition pre-processor that, while the electronic display is powered off, generates a first signal that indicates that the electronic display is predicted to be visible at a future time; and
   processing circuitry that:
      determines to suppress the electronic display;
      generates one or more control signals to power off the electronic display and to disable touch sensing based on the determination to suppress the electronic display, wherein a first control signal of the one or more control signals is configured to cause a power supply to remove a first power amount from the electronic display;
      sends the first control signal to the power supply;
      receives the first signal from the condition pre-processor; and
      returns the first power amount to the electronic display based on the first signal before the predicted future time.

2. The system of claim 1, wherein the condition pre-processor further generates the first signal based on a machine learning engine predicting a period of non-use of the electronic display.

3. The system of claim 2, wherein the processing circuitry further
   receives a second signal from the condition pre-processor; and
   returns a second power amount to the electronic display based on the first signal and the second signal before the predicted future time, wherein the second power amount is less than the first power amount.

4. The system of claim 3, wherein the electronic display renders, after being returned the second power amount, an image corresponding to a de-contented image frame associated with an always-on display operational mode, and wherein the de-contented image frame presents a slower updating clock, a reduced number of widgets, a reduced number of digital contented items, or any combination thereof, relative to that used in a normal operational mode.

5. The system of claim 3, wherein the processing circuitry further
   receives a third signal from the condition pre-processor;
   generates a second control signal of the one or more control signals to power off the electronic display based on the third signal, wherein the second control signal is configured to cause the power supply to remove the second power amount; and
   generates a third control signal to return the first power amount to the electronic display based on the first signal, the second signal, the third signal, or a combination thereof before the predicted future time.

6. The system of claim 5, wherein the condition pre-processor further generates the second signal based on
   determining whether the electronic display was suppressed in a past threshold amount of time,
   determining whether the electronic display is expected to be unsuppressed within a first threshold amount of time from the predicted future time,
   determining whether the electronic display was unlocked for a second threshold amount of time while suppressed,
   determining whether the electronic display was unlocked a threshold number of times while suppressed,
   or any combination thereof.

7. The system of claim 5, wherein the processing circuitry further generates the second control signal based on determining that the electronic display was not suppressed in a past threshold amount of time, determining that the electronic display is not expected to be unsuppressed within a first threshold amount of time from the predicted future time, determining that the electronic display was not unlocked for a second threshold amount of time while suppressed, and determining that the electronic display was not unlocked a threshold number of times while suppressed.

8. The system of claim 1, wherein the condition pre-processor further generates the first signal based on a motion profile indicating one or more sensed signals that correspond to a pattern of motion.

9. The system of claim 1, wherein the processing circuitry determines to suppress the electronic display based on receiving a first indication to enter a low power mode, a second indication that an associated electronic display is no longer a threshold distance from a sensor, a third indication that the electronic display is obstructed, a fourth indication of inactivity, or any combination thereof.

10. A method comprising:
receiving a first signal that indicates an electronic display is not being used from a condition pre-processor;
generating one or more control signals to de-power the electronic display and to disable touch sensing based on the first signal;
receiving a second signal that indicates the electronic display is predicted to be visible at a first future time from the condition pre-processor; and
generating a first control signal to power the electronic display before the first future time based on the second signal.

11. The method of claim 10, comprising:
pausing a flip-book based on the first signal; and
discarding a remaining portion of the paused flip-book based on the second signal and the first future time.

12. The method of claim 10, comprising:
determining to enter a suppression mode based on the first signal; and
in response to determining to enter the suppression mode, generating the first control signal based on the first signal.

13. The method of claim 10, wherein the second signal is generated based on expected user activity data including calendar event data, alarm data, or both.

14. The method of claim 10, wherein the first signal is generated based on a period of non-use of the electronic display.

15. The method of claim 10, comprising:
receiving a third signal that indicates the electronic display is predicted to be visible at a second future time before the first future time from the condition pre-processor;
generating a second control signal to partially power the electronic display before the second future time based on the third signal; and
after the second future time, generating a third control signal to de-power the electronic display.

16. A tangible, non-transitory, computer-readable medium comprising instructions that, when executed by one or more processors, cause an electronic device to perform operations comprising:
receiving, at a first time, a first signal that indicates that an electronic display of the electronic device is predicted to be visible at a first future time from a condition pre-processor, wherein the electronic display is de-powered and touch sensing is disabled before the first time;
generating a first control signal to power the electronic display before the first future time based on the first signal; and
sending the first control signal to a power supply of the electronic display.

17. The tangible, non-transitory, computer-readable medium of claim 16, wherein the first signal is generated based on a calendar entry.

18. The tangible, non-transitory, computer-readable medium of claim 16, wherein the operations comprise:
receiving a second signal that indicates the electronic display is predicted to be visible at a second future time before the first future time from the condition pre-processor;
generating a third control signal to partially power the electronic display before the second future time based on the second signal; and
after the second future time, generating a fourth control signal to de-power the electronic display.

19. The tangible, non-transitory, computer-readable medium of claim 18, wherein the operations comprise:
generating the third control signal based on one or more sensed signals; and
generating the fourth control signal based on determining that the electronic display was not suppressed in a past threshold amount of time, that the electronic display is not expected to be unsuppressed within a first threshold amount of time from the first future time, that the electronic display was not unlocked for a second threshold amount of time while suppressed, and that the electronic display was not unlocked a threshold number of times while suppressed.

20. The tangible, non-transitory, computer-readable medium of claim 16, wherein the operations comprise generating the first control signal based on
determining that the electronic display was suppressed in a past threshold amount of time,
determining that the electronic display is expected to be unsuppressed within a first threshold amount of time from the first future time,
determining that the electronic display was unlocked for a second threshold amount of time while suppressed,
determining that the electronic display was unlocked a threshold number of times while suppressed,
or any combination thereof.

* * * * *